US012045819B2

(12) United States Patent
Baguley et al.

(10) Patent No.: US 12,045,819 B2
(45) Date of Patent: Jul. 23, 2024

(54) CONSENTED IDENTITY AS A SERVICE

(71) Applicant: Finicity Corporation, Murray, UT (US)

(72) Inventors: Nicholas Bryan Baguley, Salt Lake City, UT (US); John M. Davies, Syracuse, UT (US); Justin A. Harnish, Salt Lake City, UT (US); Nicholas A. Thomas, Orem, UT (US)

(73) Assignee: Finicity Corporation, Murray, UT (US)

( * ) Notice: Subject to any disclaimer, the term of this patent is extended or adjusted under 35 U.S.C. 154(b) by 269 days.

(21) Appl. No.: 17/701,350

(22) Filed: Mar. 22, 2022

(65) Prior Publication Data

US 2022/0300645 A1 Sep. 22, 2022

Related U.S. Application Data

(60) Provisional application No. 63/171,834, filed on Apr. 7, 2021, provisional application No. 63/164,299, filed on Mar. 22, 2021.

(51) Int. Cl.
*G06F 21/00* (2013.01)
*G06F 21/62* (2013.01)
(Continued)

(52) U.S. Cl.
CPC ..... *G06Q 20/4014* (2013.01); *G06F 21/6245* (2013.01); *G06Q 20/3821* (2013.01); *G06Q 20/3825* (2013.01); *G06Q 20/389* (2013.01)

(58) Field of Classification Search
CPC ............ G06F 21/6245; G06Q 20/3821; G06Q 20/3825; G06Q 20/4014
See application file for complete search history.

(56) References Cited

U.S. PATENT DOCUMENTS 7,076,558 B1 7/2006 Dunn
2002/0029337 A1 3/2002 Sudia et al.
(Continued)

FOREIGN PATENT DOCUMENTS

CN 102271041 8/2013
WO 2019211607 11/2019

OTHER PUBLICATIONS

PCT International Search Report and Written Opinion from PCT Application No. PCT/US2022/021343 (dated Jul. 6, 2022).
(Continued)

*Primary Examiner* — Rodman Alexander Mahmoudi
(74) *Attorney, Agent, or Firm* — Hovey Williams LLP

(57) ABSTRACT

A server includes an identity certainty model, which has permutation ensembled weights. The server receives a plurality of data access consent receipts from an external consent repository. Based on the data access consent receipts, the server retrieves a plurality of data types from one or more data providers. The server executes the identity certainty model on the data types. The server performs an ID resolution operation on the data types. Using data outputs produced by the ID resolution operation, the server calculates metrics from the ID resolution operation. A weighting of the data outputs produced by the metrics calculations is performed using the permutation ensembled weights. An identity protection score and a risk score are determined based on the weighted data outputs. An optimization operation is performed on the identity protection score and the risk score to determine an identity certainty score.

20 Claims, 20 Drawing Sheets

(51) Int. Cl.
  *G06Q 20/38*   (2012.01)
  *G06Q 20/40*   (2012.01)

(56) References Cited

U.S. PATENT DOCUMENTS

| | | |
|---|---|---|
| 2004/0003072 A1 | 1/2004 | Mathew et al. |
| 2012/0215775 A1 | 8/2012 | Allen et al. |
| 2012/0296773 A1 | 11/2012 | Carrott |
| 2019/0019184 A1 | 1/2019 | Lacey et al. |
| 2019/0139050 A1 | 5/2019 | Maheshwari |
| 2021/0192082 A1* | 6/2021 | Jones ..................... G06F 21/60 |
| 2022/0277103 A1* | 9/2022 | Brannon ............. G06F 21/6245 |

OTHER PUBLICATIONS

PCT International Search Report and Written Opinion from PCT Application No. PCT/US2022/021342 (dated Jul. 5, 2022).
www.Keyfactor.com/blog/certificate-chain-of-trust article entitled What is the Certificate Chain of Trust (dated Sep. 2, 2020).

* cited by examiner

DIRECTION $$\frac{1}{N}\sum_t 1_{sgn}(A_t - A_{t-1}) = sgn(F_t - A_{t-1})$$

$$|A - \lambda I| = \begin{vmatrix} 2-\lambda & 1 \\ 1 & 2-\lambda \end{vmatrix} = 3 - 4\lambda + \lambda^2$$

$$\text{SIMILARITY} = \cos(\theta) = \frac{A \cdot B}{\|A\|\|B\|} = \frac{\sum_{i=1}^{n} A_i B_i}{\sqrt{\sum_{i=1}^{n} A_i^2}\sqrt{\sum_{i=1}^{n} B_i^2}}$$

$$d' = \frac{\mu_S - \mu_N}{\sqrt{\frac{1}{2}(\sigma_S^2 + \sigma_N^2)}}$$

$$G_1 = 1 - \sum_{k=1}^{n}(X_k - X_{k-1})(Y_k + Y_{k-1})$$

*FIG. 14A*

CADENCE $$SS_{res} = \sum_i (y_i - f_i)^2 = \sum_i e_i^2$$

$$MAE = \frac{1}{n}\sum_{j=1}^{n} |y_j - \hat{y}_j|$$

$$MSE = \frac{1}{n}\sum_{i=1}^{n} (Y_i - \hat{Y}_i)^2$$

$$p = 1 - \sum_{C_i \neq C_{max}} \int_{x \in H_i} P(C_i|x) p(x) dx$$

| GRADIENT $\nabla f = \dfrac{\partial f}{\partial x}i + \dfrac{\partial f}{\partial y}j + \dfrac{\partial f}{\partial z}k,$ | $F_\beta = (1 + \beta^2) \cdot \dfrac{precision \cdot recall}{(\beta^2 \cdot precision) + recall}$ | $f(\partial X) = f(X) \cap \partial Y$ $f(X \setminus \partial X) \subseteq Y \setminus \partial Y$ | $I[f] = \displaystyle\int_{x \times y} V(f(\vec{x}), y) p(\vec{x}, y)\, d\vec{x}\, dy$ |
|---|---|---|---|

*FIG. 14C*

MDP DEGREES

$$E(S_n^2) = \sum_{i=1}^{n} E(Z_i^2) + 2 \sum_{1 \leq i \leq j \leq n} E(Z_i Z_j) = n.$$

$$DCG_p = \sum_{i=1}^{p} \frac{rel_i}{\log_2(i+1)} = rel_1 + \sum_{i=2}^{p} \frac{rel_i}{\log_2(i+1)}$$

$$MD = \sum_{i=1}^{n}\sum_{j=1}^{n} f(y_i)f(y_j)|y_i - y_j|.$$

$$s(i) = \begin{cases} 1 - \dfrac{a(i)}{b(i)}, & a(i) < b(i) \\ 0, & a(i) = b(i) \\ \dfrac{b(i)}{a(i)} - 1, & a(i) > b(i) \end{cases}$$

$$F_1^{macro}[h] = \frac{1}{n}\sum_{i=1}^{n} \frac{2 \times Prec_i[h] \times Recall_i[h]}{Prec_i[h] + Recall_i[h]}.$$

*FIG. 14D*

CONSENTED IDENTITY AS A SERVICE

CROSS-REFERENCE TO RELATED APPLICATIONS

Priority Applications

The present application claims priority from U.S. Provisional Patent Application No. 63/164,299, filed Mar. 22, 2021, and entitled TRUST ROOT SYSTEM FOR VERIFICATION OF USER CONSENTS, and U.S. Provisional Patent Application No. 63/171,834, filed Apr. 7, 2021, and entitled CONSENTED IDENTITY AS A SERVICE. The entire disclosure of each of the aforementioned priority applications is hereby incorporated by reference herein.

Contemporaneous Applications

The present application is filed contemporaneously with U.S. Pat. application Ser. No. 17/701,317, entitled TRUST ROOT SYSTEM FOR VERIFICATION OF USER CONSENTS. The entire disclosure of the aforementioned contemporaneously filed application is hereby incorporated herein by reference.

FIELD OF THE DISCLOSURE

The field of the disclosure relates generally to consent management and, more particularly, to a trust root system for centralizing consent management for customer permissioned transactions between multiple related entities.

BACKGROUND OF THE DISCLOSURE

Presently, customers engage with service providers and provide consent through a singular interface and experience. Consent is considered maintained unless a user expressly revokes consent. The consent sought, therefore, must include all possible uses of the user data so that it can be received from the user. However, as technology improves and new services are offered, updating consent is difficult in this model. Additionally, even where appropriate consent scope is received, it can also be difficult and expensive to audit and prove consent for a transaction after the fact.

Demonstrating the collection and verification of end-user consent is not only required for many forms of business but also clearly demonstrates how an organization positions itself with protecting end-user privacy. Increasing jurisdiction-specific legal pressure is causing a fractured landscape, which causes confusion with customers and can lead to operational uncertainty for a business as they navigate the labyrinth of regulations.

Furthermore, the traditional function of authentication is tightly coupled with a system that manages authorizations. There are many historical reasons why this is the case, including that it simplified role-based access controls, but we are entering an age where the authorizations that an entity grants and is granted does not fit well within the current definition of a purely role, group, or other broad grouping.

Know Your Customer (KYC) standards and the laws and best practices that surround identity resolution and identity affirmation not only facilitate preventing money laundering and fraudulent activity, but also facilitate enabling identity security, account suitability, and risk. Demands for rigorous and multifaceted identification and validation has grown beyond financial institutions and is becoming table stakes in transactions of any size, but also is likely to become a technological treadmill where continuing advancements are required in authentication as deep-fake countermeasures gain greater acuity.

Identity resolution is defined as a combination of activities during an interaction that facilitates bringing an identity claim within organizational risk tolerances. Society has assumed many of the risk tolerances of organizations leading in this space, with financial and medical identification resolution risk tolerances being broadly higher in the population than online retail shopping, for example. Identity affirmation is largely used after identity resolution and is defined as a combination of activities that provide supporting evidence for an identity claim to facilitate establishing trust in an interaction, such that fraud is not taking place or the creditworthiness of the customer.

As the use of data increases, the world is recognizing that the beneficial nature of sharing information also has potentially negative side effects. These side effects include privacy concerns, as well as specific activities requiring broader oversight, such as financial theft, identity theft, and profiteering from data.

Aside from privacy, jurisdictions are starting to recognize the need for data and the need for defining ownership of data. Jurisdictions also recognize the need to provide data owners transparency into their data usage.

Ownership and transparency are introducing additional complexities to any business; however, for sensitive areas of business such as finance, these issues complicate how information is used. Role-based access controls and identity and access management are not sufficient in their granularity to fully define the future of permissioned data. Consequently, there is a need to provide extensible mechanisms for defining the constraints of information handling.

A unified consent management solution would allow a business to address both privacy concerns and limit legal exposure by creating processes by which customers can, with fine detail, grant permission to a business to use their data. Such a system should not only have the ability to easily manage permissions, but it should also create a mechanism to view who has the user's data and for what purpose it was used. The ability to demonstrate that the business is a good steward of customer data creates a trust relationship between the customer and the business.

Furthermore, a single source of consent wrangles the problem of data resolution and affirmation into a stochastic and collaborative solution between customer, merchant, and financial institution.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a server is provided. The server includes an identity certainty model including permutation ensembled weights. The server also includes a processor and a memory. The memory includes computer-executable instructions stored thereon. The computer-executable instructions, when executed by the processor, cause the processor to receive a plurality of data access consent receipts from an external consent repository. Based on the plurality of data access consent receipts, the computer-executable instructions cause the processor to retrieve a plurality of data types from one or more data providers. The computer-executable instructions cause the processor to execute the identity certainty model on the plurality of data types, which includes performing an identity (ID) resolution operation on the plurality of data types. Using data outputs produced by the ID resolution operation, the executing step includes calculating metrics from the ID resolution operation. The executing step also includes, using the permutation ensembled weights, weighting data outputs produced by the metrics calculations. Moreover, the executing step includes determining an identity protection score and a risk score based on the weighted data outputs. The executing step also includes performing an optimization operation on the identity protection score and the risk score, and determining an identity certainty score based on a result of the optimization operation.

In another aspect, a computer-implemented method is provided. The method is performed by a server. The server includes a processor and an identity certainty model. The identity certainty model includes permutation ensembled weights. The method includes receiving, by the processor, the plurality of data access consent receipts from an external consent repository. The method also includes, based on the plurality of data access consent receipts, retrieving, by the processor, a plurality of data types from one or more data providers. Furthermore, the method includes executing, by the processor, the identity certainty model on the plurality of data types. The executing step includes performing, via the processor, an identity (ID) resolution operation on the plurality of data types. In addition, the executing step includes, using data outputs produced by the ID resolution operation, calculating, via the processor, metrics from the ID resolution operation. Moreover, the executing step includes, using the permutation ensembled weights, weighting, via the processor, data outputs produced by the metrics calculations. Additionally, the executing step includes determining, via the processor, an identity protection score and a risk score based on the weighted data outputs. The executing step also includes performing, via the processor, an optimization operation on the identity protection score and the risk score, and determining, via the processor, an identity certainty score based on a result of the optimization operation.

In yet another aspect, a computer-readable storage medium is provided. The computer-readable storage medium includes computer-executable instructions stored thereon for use by a server. The server includes a processor and an identity certainty model. The identity certainty model includes permutation ensembled weights. The computer-executable instructions, when executed by the processor, cause the processor to receive a plurality of data access consent receipts from an external consent repository. The computer-executable instructions also cause the processor to, based on the plurality of data access consent receipts, retrieve a plurality of data types from one or more data providers. In addition, the computer-executable instructions cause the processor to execute the identity certainty model on the plurality of data types. The executing step includes performing an identity (ID) resolution operation on the plurality of data types. Furthermore, using data outputs produced by the ID resolution operation, the executing step includes calculating metrics from the ID resolution operation. The executing step also includes, using the permutation ensembled weights, weighting data outputs produced by the metrics calculations. Moreover, the executing step includes determining an identity protection score and a risk score based on the weighted data outputs, performing an optimization operation on the identity protection score and the risk score, and determining an identity certainty score based on a result of the optimization operation.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the aspects described herein are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

FIG. 14A depicts a list of some of the most common formulas for calculating metrics from a direction model;

FIG. 14B depicts a list of some of the most common formulas for calculating metrics from a cadence model;

FIG. 14C depicts a list of some of the most common formulas for calculating metrics from a gradient model;

FIG. 14D depicts a list of some of the most common formulas for calculating metrics from the Markov decision process (MDP) degrees model;

Figure 1:
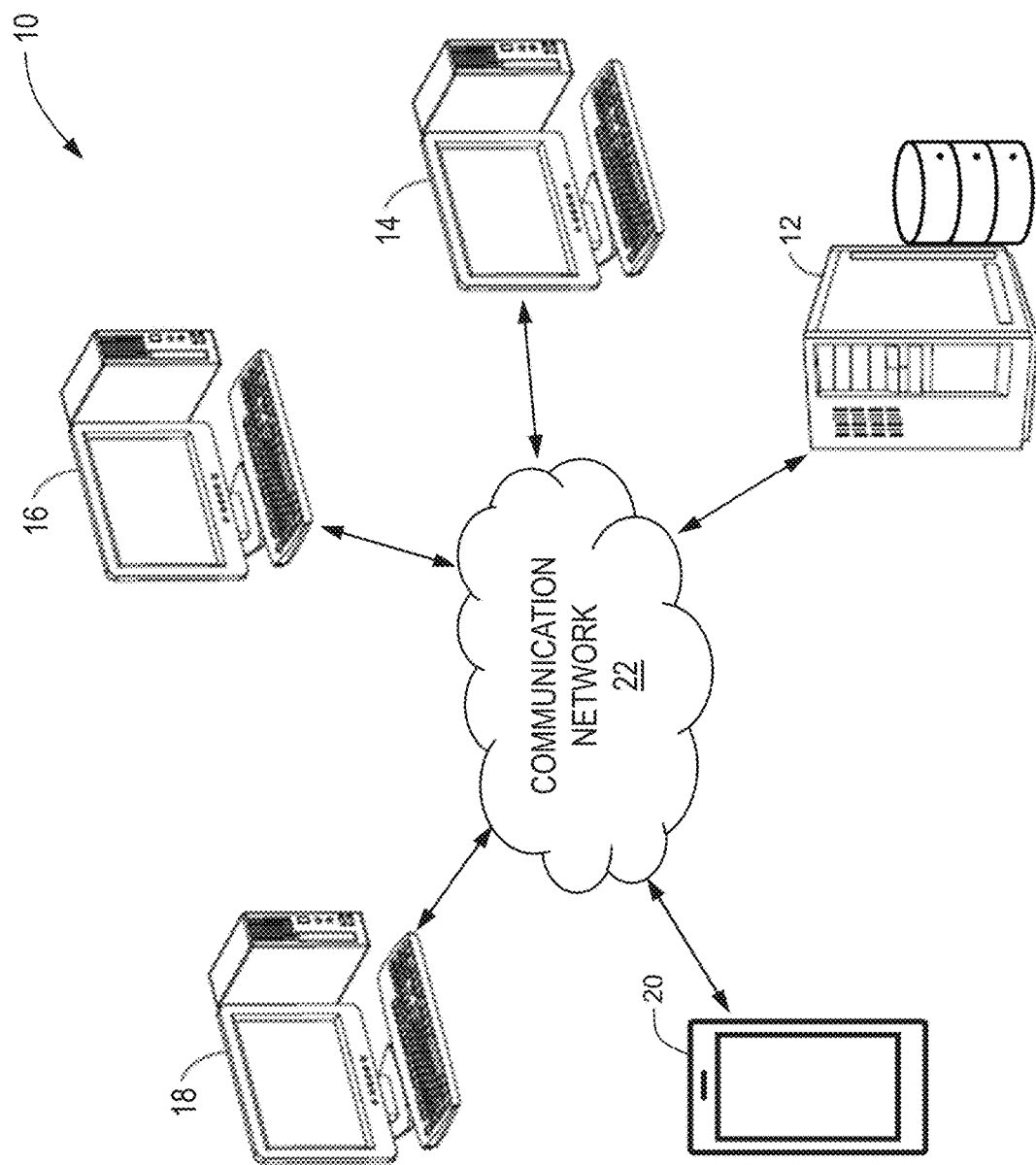
FIG. 1 is a schematic of a trust root system, in accordance with an aspect of the present invention.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object-oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

The first portion of the disclosure broadly concerns methods and systems for centralizing consent management for customer permissioned transactions between multiple related entities. More specifically, a specially programmed computer, referred to as a trust root server, is configured to track, propagate, update, cancel, and audit customer data access permissions or consents through a centralized trust service that is operable independently from the systems of each involved entity. Such consent management provides the capability to collect purpose, parties, duration, and digital signatures to provide non-repudiation and/or provenance. A trust root server is configured to include a repository that publishes customer data access consents to entities within the system through a PUSH methodology. Similarly, consent may be revoked or modified in a similar fashion such that the trust root server receives updates from an entity as received at the entity from the customer.

In one embodiment, customer consent can be modified from any entity in the system, with corresponding changes being propagated to each other entity. Depending on the entity, the modification may result in a different type of modification at that particular entity. For example, a modification request may result in a cancellation at one entity, an increase in scope at another entity, and a decrease in scope at another entity, all for the same user and with all changes occurring simultaneously. In some embodiments, a modification may be handled through a centralized trust service that analyzes a modification made by a user at any of the entities to determine how to propagate changes to other entities in order to effectuate the modification.

Changes are tracked in a manner that remains immutable and auditable within the system. In such embodiments, changes are configured to supersede prior configurations without directly modifying or altering the original configuration. Such changes may be layered such that a user may have one (1), ten (10), ten thousand (10,000), or effectively innumerable changes, each version of which is tied to the same user and auditable in order to determine transactions or processes that were applied against which version of the user permission and to determine whether such transactions or processes were executed according to the proper set of consents.

Transactions are executed on behalf of the user based on the user's established consent permissions. Upon completion or failure of a requested transaction, based on a current set of permissions, a receipt for the transaction is created. The receipt may be provided to the user and to any such entity that may request or require a receipt and/or by an entity connected to the user. The receipt may include immutable evidence of the authority and consent to execute the transaction. In some embodiments, the receipt may also be usable by an entity to directly identify data elements that were used in the transaction, including identifying pre-transaction data values and corresponding post-transaction data results. A user may utilize such receipts in order to challenge or correct the outcome of a transaction based on identifying pre-transaction data that may have incorrect or incomplete values or context.

In certain embodiments, encryption keys may be utilized in order to control which entities have access to certain user data attributes. This may include dictating scope of use, duration of use, or other parameters. Encryption keys may be implemented in a dynamic manner such that an entity must return to a trust root each time the entity wishes to process the user data to ensure that processing is only possible after proper consent has been validated and logged. In other embodiments, tuple keys may be utilized to limit the older of one portion of the tuple from being able to perform an action without receiving the other half from a trust root, another entity, or the customer.

In some instances, the processing of user data for a purpose to which the user has consented includes multiple different entities. In some instances, one or more of the entities may provide a necessary technological purpose (e.g., a data conduit), but the entity does not need to directly process the data in a manner that requires consent. In such instances, the trust root can verify that data was received by an entity without consent but allow the data to pass through that entity while verifying that the entity did not process the data in a way that affects a user's privacy.

Similarly, a trust root may be implemented in a manner that ensures that a terminal entity that itself has consent to process user data does not improperly expand the consent scope to allow other entities to process the user data.

In some embodiments, a consent object which is capable of fully identifying all parties involved with a data sharing agreement and the encompassing detailed constraints is incorporated. The consent object is portable so that parties involved from customer to data recipient can comply with the customer's directives.

Consent, as used herein, is broad enough to encompass permissions such as terms and conditions as well as data sharing agreements. The data structures are flexible enough to support these identified use cases as well as extensible enough that related use cases may also be supported without significant rework. Furthermore, consent includes a customer granting permission to another entity to access financial data within specific constraints. All entities within the consent shall be clearly identified, and specific-use constraints shall clearly identify the source of the data, how it may be used, for what duration, and where the data may be shared.

Entering the consent management system can happen with any of the involved parties and the consent or verification of consent will be made available to all required parties. Businesses can use the consent management system to mitigate business risk by having demonstrable consent as well as proving how the data is being used. As regulations change, it becomes easy to audit compliance and, if necessary, ask for updated consent.

The customer is integrated into the consent management system at onboarding and is allowed to manage their consents through the span of their engagement with a business. The customer is also able to view transparency reports. The transparency reports identify who is using the data and for what purpose.

In an embodiment, a consent receipt is the data object representing consent. The consent receipt describes the granted permissions and associated constraints. The consent receipt is the immutable record describing a consent grant and is shared with all of the involved parties.

The consent receipt is archived by a trusted party. The trusted party provides multiple interfaces supporting management of the consent receipt, such as updates and revocations. The trusted party provides distribution mechanisms to each identified party including, at a minimum, the subject entity, the financial institution holding the accounts, and the data recipient. Certain types of data processing and business agreements rely on data access providers, and, if they are involved in the process, the consent receipt is made available to those parties as well.

The trusted party stores or records the consent receipt on a write once read many (WORM) system. This process balances the complexities of a receipt and its changes with the need for clear understanding what consents were in effect at any specific point in time. As new consents are added, or original consents updated, new consent receipts are registered and appended within the system.

To enable the immutability and to add non-repudiation of the consent receipt, a digital signature is included to sign the constraints of the consent. The consent receipt digital signature is created by the trusted anchor repository. Additionally, the consent receipt may include a digital signature of the requestor to increase the chain of trust during the grant request to issuance between the customer and trusted anchor.

Due to the consent receipt being immutable, the update process for an existing consent receipt generates a new consent receipt, which is stored in the repository and linked to original consent receipt. Revocations are supported by creating a new consent receipt indicating revocation, linked to the original grant, and stored within the trusted anchor repository.

As discussed above, there is a need to provide extensible mechanisms for defining the constraints of information handling. To support this extensibility, in an embodiment, the system includes a discrete authentication system and a discrete authorization system. The authentication system provides the "WHO," and the authorization system provides answers to the "WHAT" and "WHERE."

Importantly, each entity has different legal and corporate requirements concerning tracking identity. The connected nature of the world means an entity will interact with many other entities and set up data sharing agreements between each. The constraints created during a sharing agreement are universal and not dependent on the entities involved.

Creating a universal definition of consent (or permission) solves many integration friction points by creating a standardized representation of the data usage constraints. Being universal and having substantive differences from identity and access management, the split of authorization from authentication ensures that it will remain extensible.

Many business processes handle collection of consent differently. For a robust consent management solution to be effective, a singular process by which an entity can request and record consent is imperative. In cases where data recipients are collecting consent, the collected consent is generally not comprehensive nor made discoverable to the customer. In an embodiment, the collective system provides a level of security where not only the terms of the consent are actively recorded, but the system also supports the collection of context around the grant for the purpose of providing as much information as possible describing the provenance of the consent.

In certain embodiments, one or more consent enforcement points are established. A consent enforcement point provides a gating mechanism where systems may prove and record that they have proper consent before any processing or sharing of data is done. The introduction of this capability allows for consent changes to be made and enforced in near real time. The system records the result of the enforcement action in a time series manner, which will be used to create transparency reports.

Exemplary Trust Root System

FIG. 1 is a schematic of a trust root system 10, in accordance with one aspect of the present invention. The trust root system 10 is configured to centralize consent management and identity validation/certification for customer permissioned transactions between one or more entities, such as one or more financial institutions, data access platform providers, third party providers (TPPs) (also may be referred to herein as Fintechs), and a customer. In the exemplary embodiment, the trust root system 10 includes a database server 12 (broadly, a computing device), which is coupled in communication to one or more other computing devices, such as client devices 14, 16, and 18, and customer device 20 across a communications network 22.

The network 22 includes, for example and without limitation, one or more of a local area network (LAN), a wide area network (WAN) (e.g., the Internet, etc.), a mobile network, a virtual network, and/or any other suitable public and/or private network capable of facilitating communication among the database server 12, client devices 14, 16, and 18, and/or the customer device 20. In some embodiments, the network 22 includes more than one type of network, such as a private transaction network provided by server 12 to one or more of the client devices 14, 16, and 18, and, separately, the public Internet, which may facilitate communication between the customer device 20, the server 12, and/or one or more of the client devices 14, 16, and 18, etc. It is noted that the trust root system 10 may include more or fewer client devices, more than one customer device, no customer device, and/or more than one server connected to the network 22.

Furthermore, it is contemplated that aspects of the present invention may incorporate cloud-based architectures where one or more computer functions are performed by remote computer systems and computing devices at the request of a local computing device. Thus, one or more of the database server 12, client devices 14, 16, and 18 and/or the customer device 20 may include a computing device having a limited set of hardware and/or software resources. As such, such a computing device may access hardware and/or software resources provided across the network 22 by other computing devices and/or resources (not shown). Such a computing device may access the resources via an access program, such as a web browser, and the results of any computer functions and/or resources may be presented to a user of the computing device via the access program. In such an embodiment, the computing device may include any type of computing device and/or electronic device configured for use in a cloud computing environment, including traditional desktop and laptop computers, smart phones and other smart devices, tablet computers, or any other computing device configured to access remote computing resources through an access program, such as a web browser.

Figure 2:
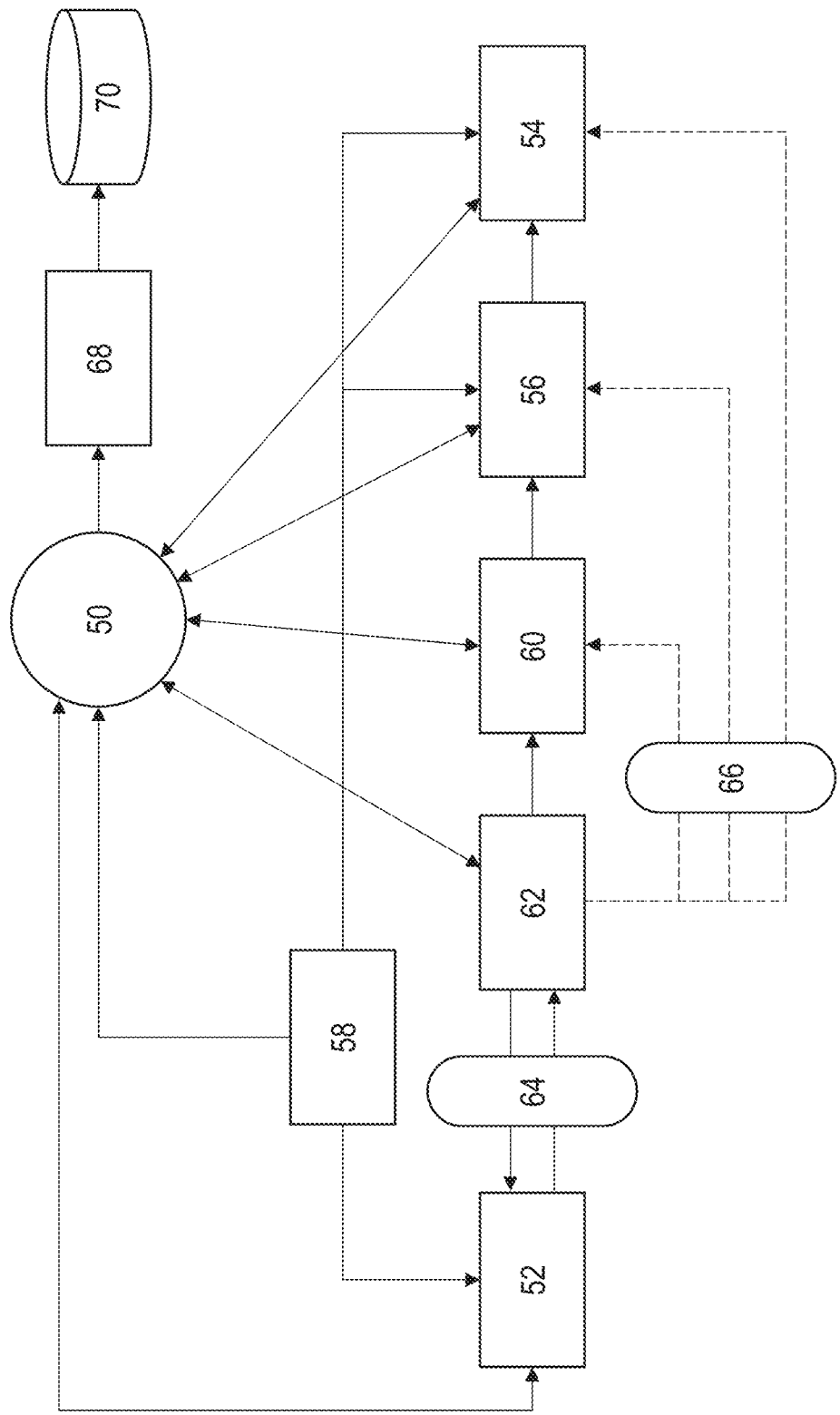
FIG. 2 is a schematic diagram showing relationships between financial institutions, a trust root system provider, data access providers, third party providers (TPPs), and customers, in accordance with aspects of the present invention.

FIG. 2 is a schematic diagram showing relationships between financial institutions, a trust root system provider, data access providers, third party providers (TPPs), and customers, in accordance with aspects of the present invention. A trust root system provider provides a trust root server 50 (such as the server 12 shown in FIG. 1). The trust root server 50 is coupled in communication to one or more networks, such as the network 22 (shown in FIG. 1), such that the trust root server 50 can communicate with the financial institutions, data access providers, third party providers (TPPs), and customers. As depicted in FIG. 2, the trust root server 50 is coupled in communication with a financial institution 52. In an embodiment, the financial institution 52 pushes transaction information to the trust root server 50, for example, as transactions occur. Alternatively, in another embodiment, the trust root server 50 may be configured to pull transactions from the financial institution 52 from time to time, such as after a period when communication has been lost or otherwise interrupted.

The trust root server 50 is also coupled in communication with TPP 54 and TPP 56. It is noted that TPPs, such as TPPs 54 and 56, and Fintechs provide customers, such as customer 58, access to new products and services related to a customer's financial accounts. TPPs and Fintechs include, for example, account information service providers (AISPs), payment initiation service providers (PISPs), mortgage providers, etc. Examples include PayPal®, Square®, Stripe®, etc. In order for the TPPs and Fintechs to provide account services to the customer 58, the TPPs and Fintechs require access to the customer's financial information.

As depicted in FIG. 2, the trust root server 50 is also coupled in communication with data access platform providers 60 and 62. In the example embodiment, data access platform providers facilitate the transfer of data, such as financial data, between a data provider (such as a financial institution) and a data recipient (such as a TPP). As indicated in FIG. 2, one or more filters 64 and 66 may be applied to data exchanges between the financial institution 52, the TPPs 54 and 56, and/or the data access platform providers 60 and 62.

The trust root server 50 is coupled to a consent management system 68. The consent management system 68 is configured to track customer granted consent, for example, to their financial data. Via the consent management system 68, customer consents are tracked, propagated, updated, cancelled, and audited through a centralized trust service (e.g., the trust root server 50) that operates independently from the computing systems of each involved entity (e.g., the financial institution 52, the TPPs 54 and 56, and the data access platform providers 60 and 62). The consent management system 68 is configured to collect purpose, parties, duration, and digital signatures to provide non-repudiation and/or provenance. Thus, the trust root server 50 functions as a gatekeeper, ensuring that all customer consents for financial data are collected, managed, and distributed between all transacting parties or entities before enabling the customer's financial data to be transmitted to one or more data recipients.

The trust root server 50 includes a consent store or repository 70. The consent management system 68 is configured to publish customer consents, via one or more consent receipts, to entities within the system through a PUSH methodology. Similarly, customer consent may be revoked or modified in a similar fashion such that the trust root server 50 receives updates from the entities as received at the entity from the customer 58.

Figure 3:
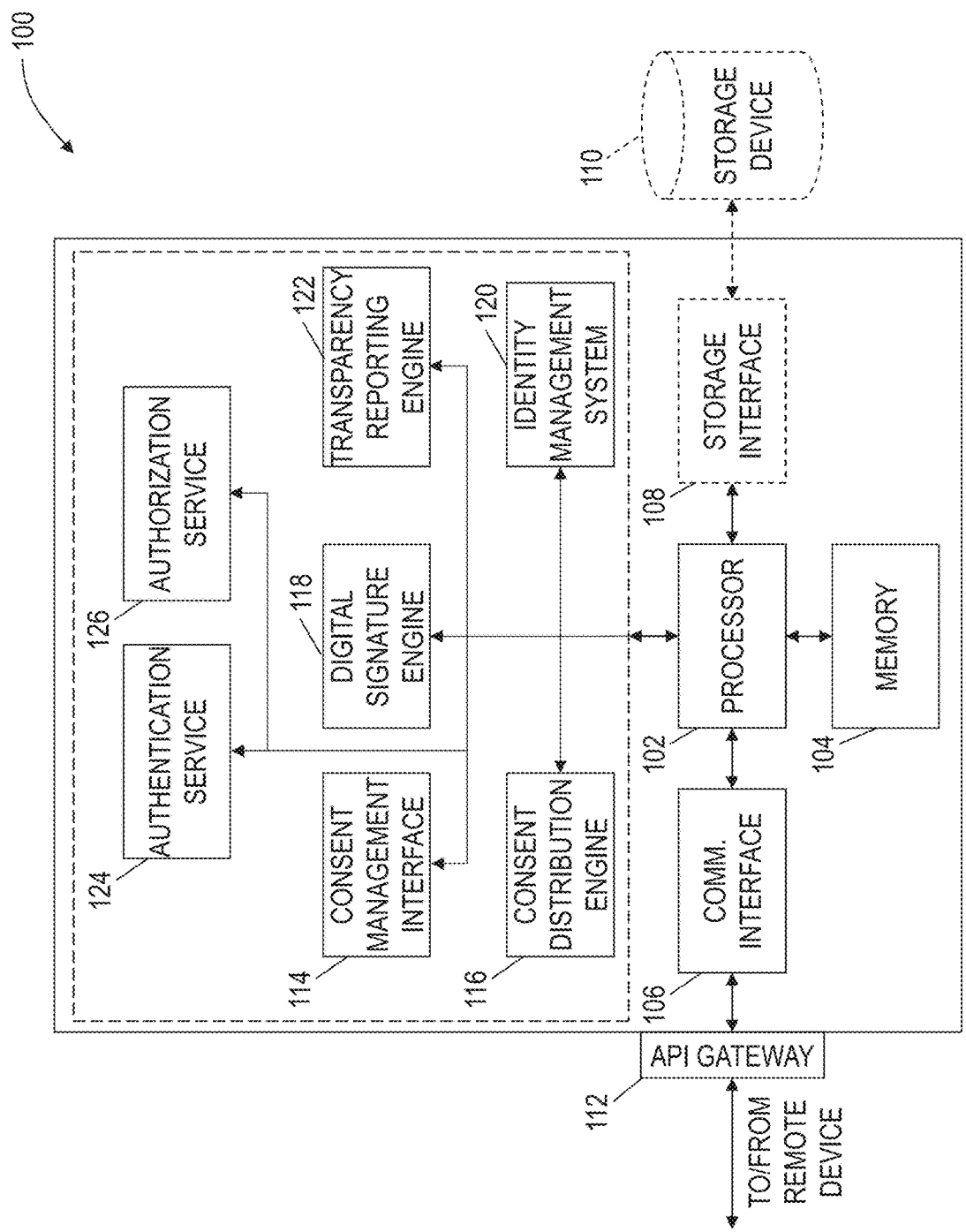
FIG. 3 is an example configuration of a server system for use in the trust root system of FIG. 1.

FIG. 3 is an example configuration of a server system 100, such as the servers 12 and 50 (shown in FIGS. 1 and 2, respectively). The server system 100 includes, but is not limited to, the consent store or repository 70 (shown in FIG. 2). In the example embodiment, the server system 100 includes a processor 102 for executing instructions. The instructions may be stored in a memory area 104, for example. The processor 102 includes one or more processing units (e.g., in a multi-core configuration) for executing the instructions. The instructions may be executed within a variety of different operating systems on the server system 100, such as UNIX, LINUX, Microsoft Windows®, etc. More specifically, the instructions may cause various data manipulations on data stored in a storage device 110 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

The processor 102 is operatively coupled to a communication interface 106 such that the server system 100 can communicate with a remote computing device, for example, operated by the financial institution 52, the TPPs 54 and 56, and the data access platform providers 60 and 62 (shown in FIG. 2) and/or other computing and/or server systems. For example, the communication interface 106 may receive communications from one or more of the client devices 14, 16, and 18, and/or the customer device 20 across the communications network 22 (e.g., via the Internet).

The processor 102 is operatively coupled to the storage device 110. The storage device 110 is any computer-operated hardware suitable for storing and/or retrieving data, such as the consent store or repository 70. In some embodiments, the storage device 110 is integrated in the server system 100. In other embodiments, the storage device 110 is external to the server system 100 and is similar to the transaction database 26. For example, the server system 100 may include one or more hard disk drives that function as the storage device 110. In other embodiments, the storage device 110 is external to the server system 100 and may be accessed by a plurality of server systems. For example, the storage device 110 may include multiple storage units such as hard disks or solid-state disks in a redundant array of inexpensive disks (RAID) configuration. The storage device 110 may include a storage area network (SAN) and/or a network attached storage (NAS) system. In one example, the storage device 110 includes a write once read many (WORM) database system.

In one embodiment, the storage device 110 includes either a body of data, a relational database management system (RDBMS), or both. The storage device 110 includes, for example, and without limitation, a collection of data including hierarchical databases, relational databases, flat file databases, object-relational databases, object-oriented databases, and any other structured collection of records or data that is stored in a computer system. However, any database may be used that enables the systems and methods to operate as described herein.

In some embodiments, the processor 102 is operatively coupled to the storage device 110 via a storage interface 108. The storage interface 108 is any component capable of providing the processor 102 with access to the storage device 110. The storage interface 108 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 102 with access to the storage device 110.

The memory area 104 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In the example embodiment, the server system 100 includes an application programming interface (API) gateway 112. The API gateway 112 facilitates the management (creation, revocation, validation, etc.) of customer consents for granting access to a customer's financial data. The server system also includes a consent management interface 114, a consent distribution engine 116, a digital signature engine 118, an identity management system 120, a transparency reporting engine 122, an authentication service 124, an authorization service 126, and an event bus 128. Each of the data engines and systems are operable or executable by the processor 102.

The consent management interface 114 is configured to provide multiple interfaces supporting management of a customer consent receipt, as described herein, including receipt generation, updates, and revocations. The consent management interface 114 is accessed for example, via one or more API calls via the API gateway 112. Accessing the consent management interface 114 can be performed with any of the involved parties and the consent or verification of consent will be made available to all required parties.

The consent distribution engine 116 is configured to distribute the customer consents, via consent receipts as discussed herein, to all required parties. In one example, the consent distribution engine 116 facilitates a publish/subscribe (pub/sub) messaging service. A pub/sub service enables the server system 100 to create systems of event producers and customers, called publishers and subscribers. Publishers communicate with subscribers asynchronously by broadcasting events, rather than by synchronous remote procedure calls (RPCs). In the example, the consent distribution engine 116 is configured to publish changes (e.g., new consents, updated consents, revocations, and expirations) to the event bus 128.

The digital signature engine 118 facilitates generating one or more digital signatures for the required parties. As described herein, to facilitate immutability of the consent receipts and to add non-repudiation of the consent receipts, a digital signature is included to sign the constraints of the consent receipt. Additionally, the consent receipts may include a digital signature of the requestor to facilitate increasing the chain of trust during a grant request to issuance between the customer and the server system 100.

The identity management system 120 facilitates generating and/or finding unique identifiers for each of the required parties and/or applications. For example, each of the financial institution 52, the TPPs 54 and 56, the customer 58, and the data access platform providers 60 and 62 are assigned a unique identifier by the identity management system 120. Furthermore, each service provided by the financial institution 52, the TPPs 54 and 56, and the data access platform providers 60 and 62 is assigned a unique identifier. In an example embodiment, the identity management system 120 may generate and store a PartnerID for each of the financial institution 52, the TPPs 54 and 56, and the data access platform providers 60 and 62, an ApplicationID for each service provided by the financial institution 52, the TPPs 54 and 56, and the data access platform providers 60 and 62, and a CustomerID for each customer or customer of the financial institution 52, the TPPs 54 and 56, and the data access platform providers 60 and 62.

The transparency reporting engine 122 is configured to generate one or more transparency reports. Each transparency report details how any financial data has been used and by which parties and/or services. As described herein, the server system 100 (e.g., trust root server 50) logs each data request, including the requester, the processing of the data, the time, etc. and correlates the actions with a specific customer consent. Thus, a customer, such as the customer 58, viewing a transparency report is able to identify the party that requested and received his or her financial data and identify how the financial data has been used.

The authentication service 124 and the authorization service 126 are configured to authenticate a customer (e.g., via a credential check) and subsequently determine what authorizations are available (e.g., via a role check and consolidated consents). For example, the authentication service 124 determine the "WHO" and the authorization service 126 determines the "WHAT" and "WHERE."

Customer Consent Request and Receipt

Figure 4:
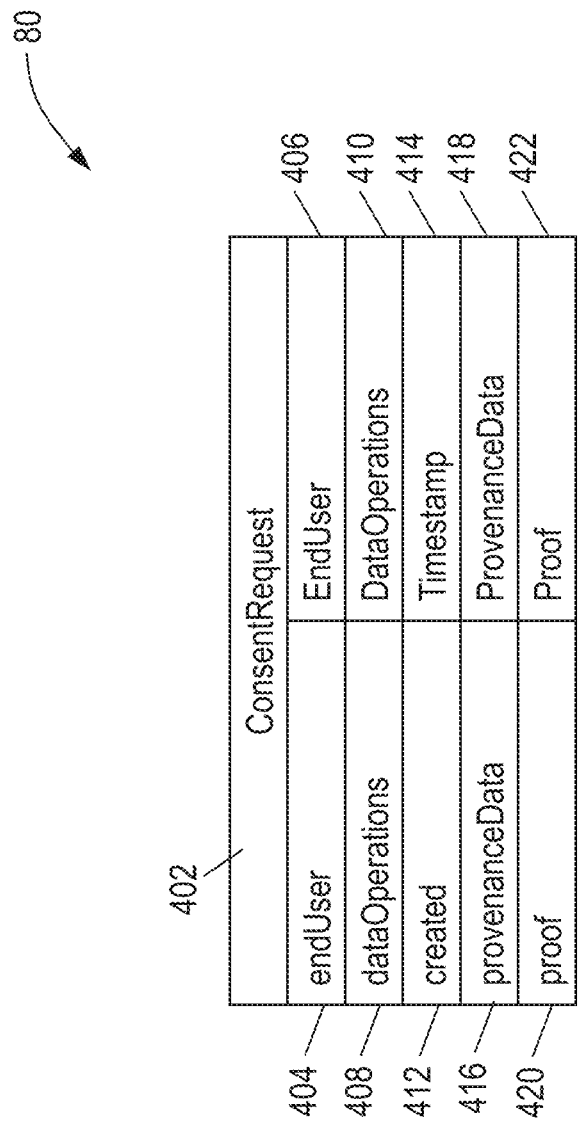
FIG. 4 is a table representing a consent request for use in the trust root system shown in FIG. 1.

FIG. 4 is a table representing a consent request 80. In the example, customer consent refers to a customer, such as the customer 58 (shown in FIG. 2), granting permission to an entity, such as one or more of the financial institution 52, the TPPs 54 and 56, and the data access platform providers 60 and 62, to access the customer's financial data, within specific constraints. When requesting consent, each entity to be encompassed within the consent is identified. Furthermore, specific-use constraints identify each of the following: the source of the financial data, how the financial data may be used, the duration of the consent, and where the data may be shared.

As depicted in FIG. 4, the consent request 80 includes a table name 402. In addition, the consent request 80 includes two (2) columns. The left column includes a plurality of attributes, including the following: endUser 404; dataOperations 408; created 412; provenanceData 416; and proof 420. Each attribute has a corresponding value defined in the right column. For example, the endUser 404 attribute has a corresponding EndUser 406 value, the dataOperations 408 attribute has a corresponding DataOperations 410 value, the created 412 attribute has a corresponding Timestamp 414 value, the provenanceData 416 attribute has a corresponding ProvenanceData 418 value, and the proof 420 attribute has a corresponding Proof 422 value. In the example, the EndUser 406, DataOperations 410, ProvenanceData 418, and Proof 422 values are primary keys. The primary keys reference additional database tables (not shown). The Timestamp 414 value may include an integer value indicative of a time the consent request 80 was created.

Figure 5:
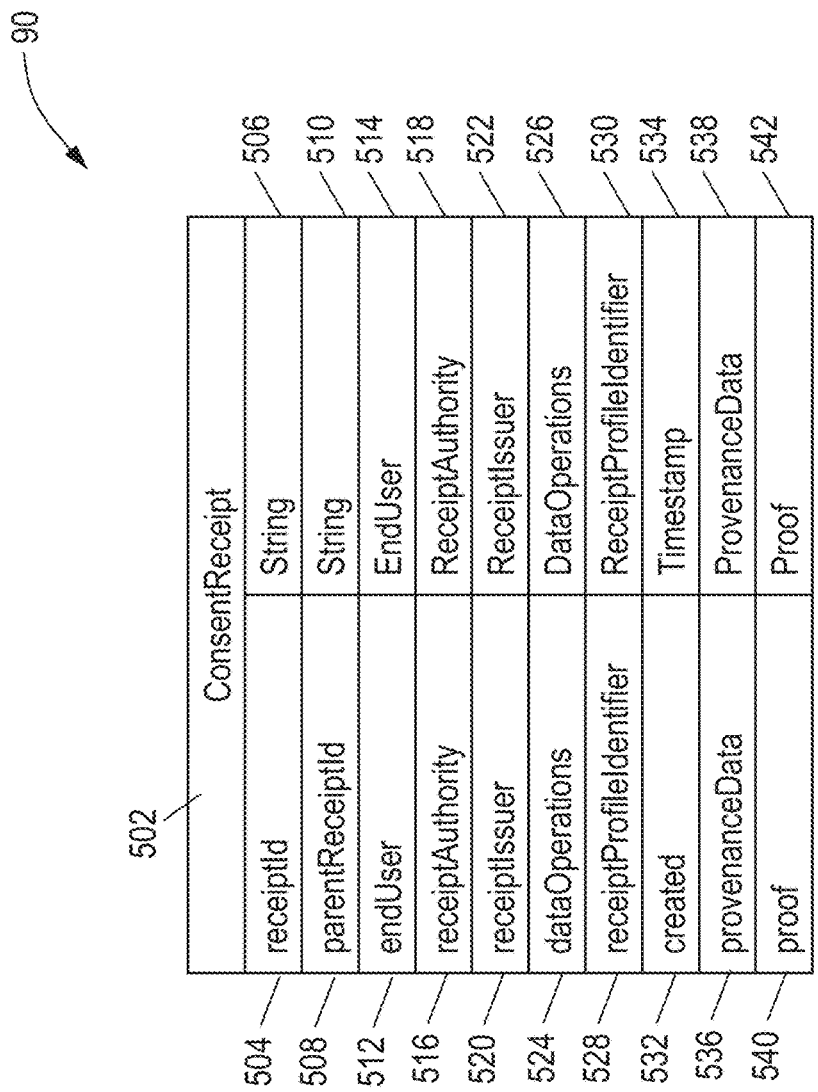
FIG. 5 is a table representing a consent receipt for use in the trust root system shown in FIG. 1.

FIG. 5 is a table representing a consent receipt 90. In the exemplary embodiment, the consent receipt 90 is the data object representing consent. The consent receipt 90 describes the granted permissions and associated constraints. Much like a receipt in a retail context proves some transaction occurred and is used in both the retailer accounting as well as for the customer's accounting purposes, the consent receipt 90 is an immutable record describing a consent grant which is shared with the involved parties.

As depicted in FIG. 5, the consent receipt 90 includes a table name 502. In addition, the consent request 80 includes two (2) columns. The left column includes a plurality of attributes, including the following: receiptId 504; parentReceiptId 508; endUser 512; receiptAuthority 516; receiptIssuer 520; dataOperations 524; receiptProfileIdentifier 528; created 532; provenanceData 536; and proof 540. Each attribute has a corresponding value defined in the right column. For example, the receiptId 504 and parentReceiptId 508 have string values 506 and 510, respectively, the endUser 512 attribute has a corresponding EndUser 514 value, the receiptAuthority 516 attribute has a corresponding ReceiptAuthority 518 value, the receiptIssuer 520 attribute has a corresponding ReceiptAuthority 518 value, the dataOperations 524 attribute has a corresponding DataOperations 526 value, the receiptProfileIdentifier 528 attribute has a corresponding ReceiptProfileIdentifier 530 value, the created 532 attribute has a corresponding Timestamp 534 value, the provenanceData 536 attribute has a corresponding ProvenanceData 538 value, and the proof 540 attribute has a corresponding Proof 542 value. In the example, the EndUser 514, ReceiptAuthority 518, ReceiptIssuer 522, DataOperations 526, ReceiptProfileIdentifier 530, ProvenanceData 538, and Proof 542 values are primary keys. The primary keys reference additional database tables (not shown). The Timestamp 414 value may include an integer value indicative of a time the consent receipt 90 was created.

In the example embodiment, the consent receipt 90 is archived by the trust root server 50. The trust root server 50 provides the consent management interface 114 (shown in FIG. 3), which supports management of the consent receipt 90, such as updates and revocations. Furthermore, as described herein, the trust root server 50 provides the consent distribution engine 116 (shown in FIG. 3) for distributing the consent receipt 90 to each identified party including, at a minimum, the subject entity, the financial institution holding the accounts, the data recipient, and/or any data access providers.

The consent receipt 90 is treated as an immutable record detailing a transaction. As described above, the trust root server 50 stores the consent receipts 90 on a write once read many (WORM) system. The WORM system facilitates balancing the complexities of a consent receipt and its changes with the need for clear understanding of what consents were in effect at any specific point in time. As new consents are added, or original consents are updated, new consent receipt versions are generated and appended or associated with the previous version within the trust root server 50.

In the example embodiment, because each consent receipt 90 is immutable, an update process for an existing consent receipt 90 includes generating a new consent receipt version. The new consent receipt version is stored in the repository, such as the consent store or repository 70, and linked to the original consent receipt or previous version. In addition, revocation of an existing consent receipt includes creating a new consent receipt version indicating revocation of the original consent receipt. The revocation consent receipt version is linked to the original consent receipt and/or previous versions and stored in the repository, such as the consent store or repository 70.

To enable immutability and to add non-repudiation of the consent receipt 90, the trust root server 50 attaches a digital signature of the customer 58 (i.e., the consent grantor) to each consent receipt 90 as it is generated. For example, the trust root server 50 attaches the digital signature via the digital signature engine 118 (shown in FIG. 3). Additionally, in some embodiments, the consent receipt 90 may include a digital signature of the requestor (i.e., the data recipient) to increase the chain of trust from the grant request to consent receipt issuance between the customer 58 and the trust root server 50.

Materialized Consent Receipt

Each consent receipt 90 includes a variety of information. Some of the information is not always relevant in data processing. Accordingly, the trust root server 50 is configured to perform a compilation process to generate a condensed view of permissions/consents. More particularly, the trust root server 50 generates a materialized consent receipt (not shown), which includes only the effective consents at the time of generation. As such, the materialized consent receipt includes the same attributes as the consent receipt depicted in FIG. 5, but the values are reduced to only those in effect at the time of generation. In an example, the compilation process performs the following operation to generate the materialized consent receipt at time T1:

At $T1$: Effective Consents=(sum of consents in scope and effect at $T1$)-(sum of revocations in scope and effect at $T1$)

The compilation process includes retrieving all consents and revocations in effect and scope at time T1. The compilation process then performs a set difference operation, which results in the effective consents at time T1. The compilation process produces multiple views of the materialized consent receipt which may be distributed to all involved parties. Thus, the computing devices of the financial institution 52, the TPPs 54 and 56, and the data access platform providers 60 and 62 use the materialized consent receipts to facilitate optimizing data processing.

Actors and Roles

As described above, the consent receipts include data identifying a data recipient and data operations to which the customer has consented. The data recipient and the data operations are associated with one or more actors and/or roles. To facilitate defining how the trust root system 10 operates and properly expresses customer consent, the trust root system 10 includes a well-defined set of actors and the roles that the actors play within the trust root system 10. In an example, an actor can be an individual, an institution, or a system. An actor initiates, processes, receives, or otherwise benefits from the customer's financial data. A role defines a set of responsibilities and abilities that are granted by a customer to an actor. It is noted that an actor may have one or more roles. Table 1 lists a plurality of actors, the associated definitions, and examples. Table 2 lists a plurality of roles, the associated definitions, and examples.

TABLE 1

| Actor | Definition | Example |
| --- | --- | --- |
| Information Owner | This is typically called a "customer" or the person/entity which owns the bank account or financial information. It is their data that is being sought for sharing. | Customer, business |
| Financial Institution | The Information Owner has account(s) at a bank, credit union, etc. which has been granted stewardship over the financial instruments. | Bank, Credit Union, Brokerages |
| Fintech Agent | Agents are used to facilitate the consumption, transformation, and distribution of financial data. This could be at the behest of the information owner or at the request of a third party. | |
| Intermediary | Intermediaries could be any service which provide value added functions on top of financial institutions or fintech agents. This could be some form of aggregation, analysis, etc. | |
| Relying Party | The relying party is an individual or entity which requests financial data for some purpose. The data they receive could originate from any of the above actors. | Mortgage broker, a separate business or individual from the owner. |

TABLE 2

| Role | Definition | Example |
| --- | --- | --- |
| End User Entity | The entity providing the consent. This is a well identified entity which may be a customer or business. If a business, the entity will need to identify the authorizing individual. | "Jane Doe" or "Lucky's Car Wash" |
| Data Access Platform | Entity which may optionally facilitate the transfer of data between the data provider and data recipient. | |
| Date Provider | The entity which provides the data specified within the consent. | ACME Bank |
| Data Recipient | The entity which receives the data specified within the consent. | Low Price Mortgage |
| Trust Anchor | A facilitator to collect, manage, and disseminate trust between all parties. | |

Consent Receipt Immutability and Specificity

Figure 6:
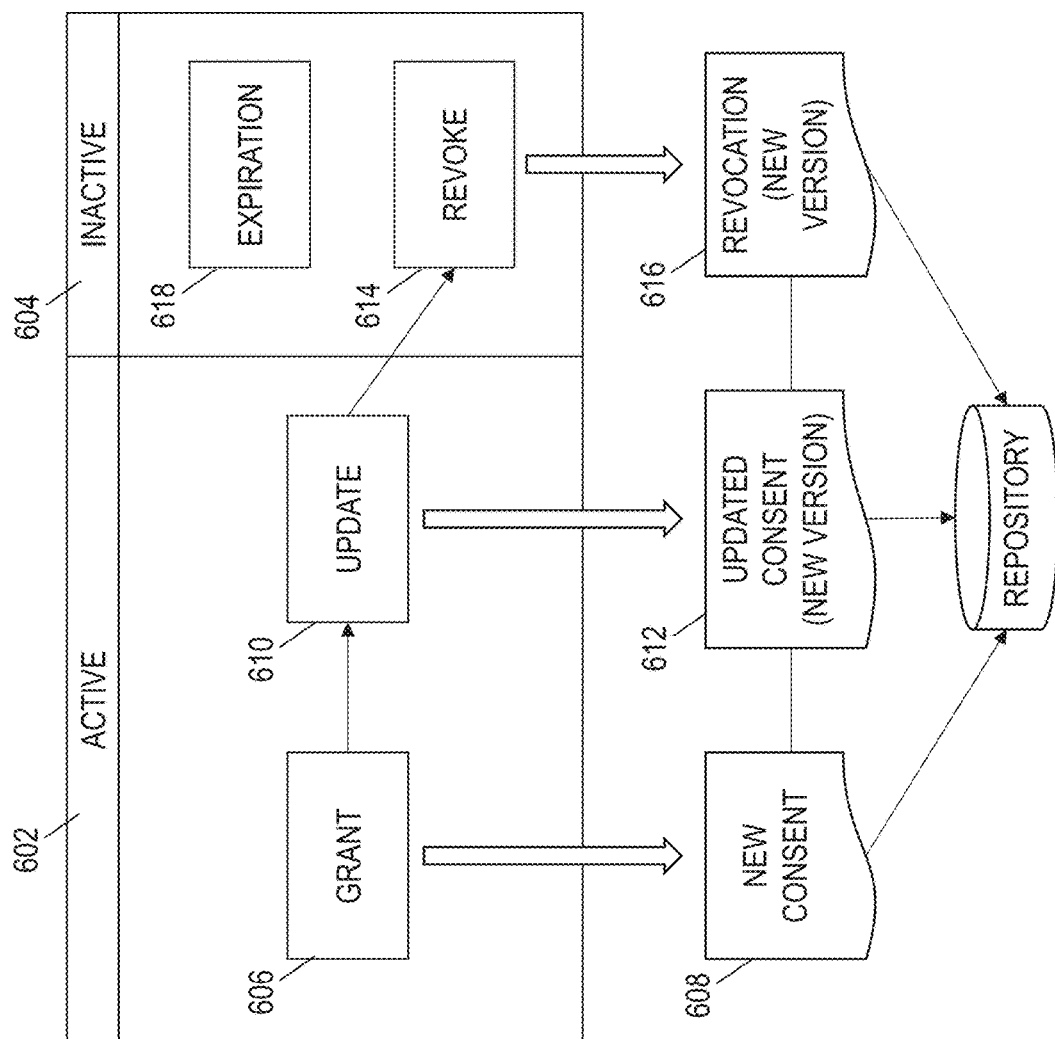
FIG. 6 is a schematic diagram depicting a lifecycle of a consent receipt, such as the consent receipt shown in FIG. 5.

As described herein, a consent receipt, such as the consent receipt 90 (shown in FIG. 5), is intended to be immutable for the purposes of creating an easily consumable record of changes over time. The consent receipt includes specificity to accurately detail the contents of the grant. To simplify the data structures representing the consent receipt, the consent receipt includes the following:

1 end user entity (for businesses it must also identify the grantor)
1 data provider
1 data recipient
0 or more data access platforms
1 type of timeframe description
1 or more data scopes
1 use case
1 or more accounts Consent Lifecycle FIG. 6 is a schematic diagram depicting the lifecycle of a consent receipt, such as the consent receipt 90 (shown in FIG. 5). In the example embodiment, consent may be granted, updated, and revoked. In addition, a given consent may have an expiration date and/or time. Consent may be actively managed by the customer, such as the customer 58 (shown in FIG. 2), to facilitate protecting the customer's privacy and controlling where their financial data is being used. Accordingly, because consent should change over time, there is a defined lifecycle of consent, as depicted in FIG. 6.

The consent lifecycle includes an active phase 602 and an inactive phase 604. In the active phase 602, the lifecycle begins with a grant operation 606. The grant operation 606 specifies the constraints of the consent, includes a customer identifier, a data recipient identifier, account information, one or more data scopes, a timeline or expiration, etc. The grant operation 606 results in a newly signed, immutable consent receipt, as depicted by reference character 608.

The active phase 602 also includes an update operation 610. The update operation 610 specifies one or more changes to the constraints of the consent, such as changes to one or more data scopes, changes to the timeline or expiration, etc. The update operation 610 results in an updated consent receipt 612. The updated consent receipt 612 includes newly signed, immutable consent receipt version, tied to the previous version.

The inactive phase 604 includes a revocation operation 614. The revocation operation 614 operates to revoke the consent receipt 608 and all of its updated consent receipts 612. The revocation operation 614 results in a revocation consent receipt 616. The revocation consent receipt 616 includes a newly signed, immutable consent receipt version, tied to the previous version(s).

The inactive phase 604 includes an expiration operation 618. The expiration operation 618 operates to revoke the consent receipt 608 and all of its updated consent receipts 612. The expiration operation 618 also results in the revocation consent receipt 616. The revocation operation 618 may be automatically performed without customer input, based on a previously consented timeline or expiration.

Because each grant, update, revocation, and/or expiration operation results in a new consent receipt (or version) being stored in the repository, the trust root server 50 is able to produce the following data objects upon request:

One original consent receipt from the grant operation 606

Zero or more updated consent receipts from the update operation(s) 610

One signed revocation consent receipt 616

Data Scopes

In the example embodiment, data scopes, which are linked to the dataOperations 524 attribute (shown in FIG. 5) of the consent receipt, are well-defined enumerated constants that describe how a customer's financial data may be permissioned for use. The data scopes include primitives identifying a well-defined action. To accommodate complex usage scenarios, the consent receipt, such as the consent receipt 90, collects a set of data scope primitives from one or more data tables stored in the consent store or repository 70. The set of data scope primitives define a complete picture of the consent receipt grant.

In the exemplary embodiment, a consent receipt treats multiple data scopes as an OR'ing of the listed data scopes. For example, if a consent receipt includes the following data scopes: "account_info," "account_numbers," and "account_owner," then the computing device that received the consent receipt treats the allowed operations as follows:
Allowed Operations="account_info" OR "account_numbers" OR "account_owner"

In the example embodiment, the set of data scopes includes those listed in Table 3.

TABLE 3

| Enumerated Value | Description |
| --- | --- |
| account_info | Provides account type, creation date, etc. |
| account_numbers | Provides routing and account number for bank and CU accounts. Account number for retirement or other forms of accounts. |
| account_owner | Provide the available owner info such as name, address, contact info |
| transaction_history | Access to transactions |

It is contemplated, however, that the list of data scopes may increase over time. As new data scopes are added, it is expected that each additional data scope is "primitive" in nature and encapsulates the least number of permissions required for an operation.

Customer Entity Onboarding

In the example embodiment, the consent generation and validation processes require machine readable specificity to the entities involved in any data flow. The trust root server 50 includes the identity management system 120 (shown in FIG. 3) to facilitate generating and/or finding unique identifiers for each of the required parties and/or applications. Because the different parties involved in the data flow have different mechanisms to identify entities, the identity management system 120 allows for entities within the processing chain to cross reference internal identifiers against a universal entity identifier (e.g., a FinID matched to the CustomerID) stored by the trust root server 50. The universal entity identifier allows a singular consent receipt to be used by many parties. When the process of consent collection begins, the party initiating the action must take proper care to collect all required information (regulatory, business, etc.) and create a mapping between any internal identifiers and the universal identifier. The identity management system 120 provides a match and merge process by which different entity identifiers that prove to correspond to the same entity may be merged into a single identifier.

Exemplary Computer-Implemented Methods

Figure 7A:
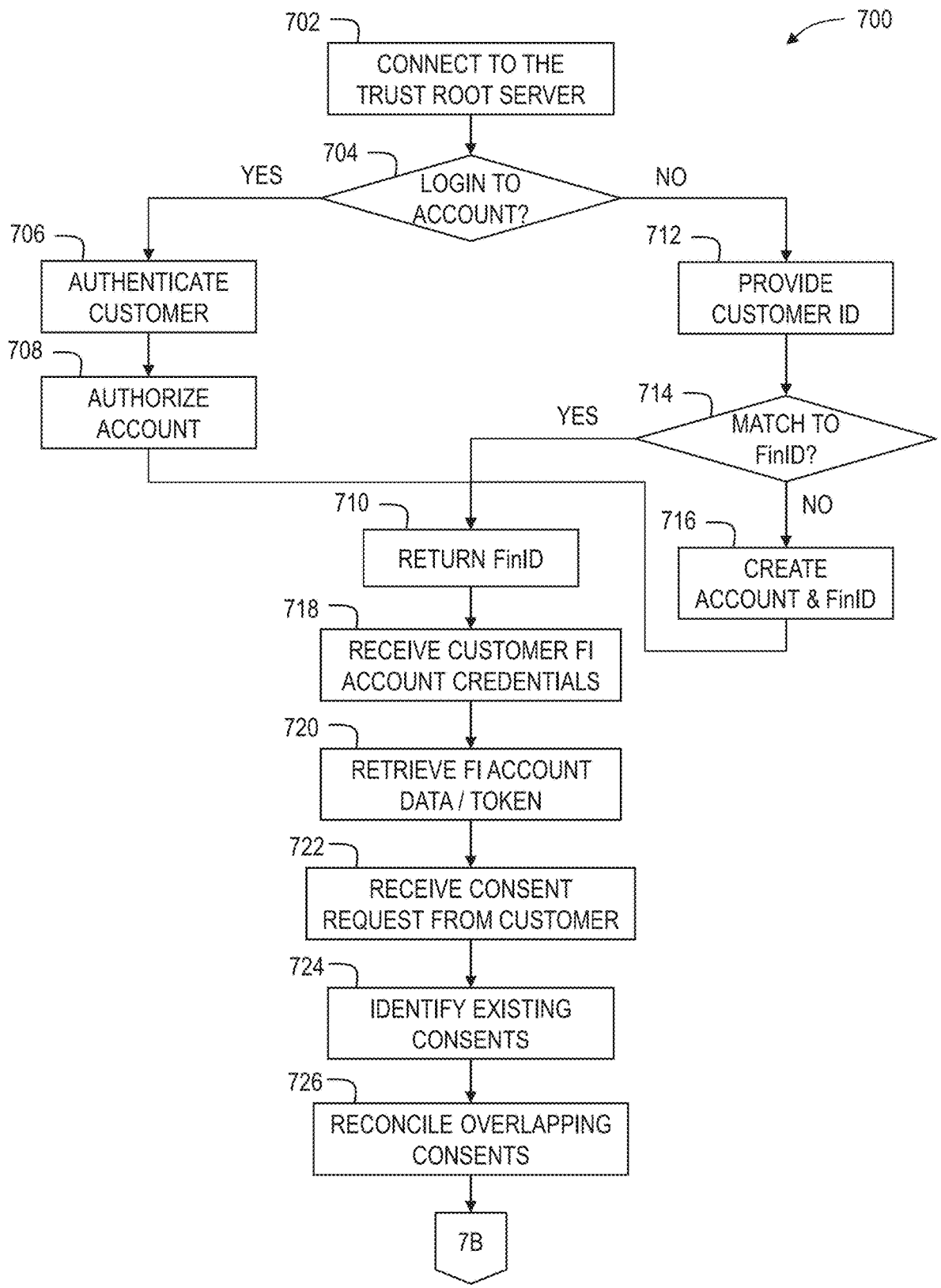
FIGS. 7A and 7B depict a flowchart illustrating an exemplary computer-implemented method for creating data access consent to financial data of a customer, in accordance with an aspect of the present disclosure.
Figure 7B:
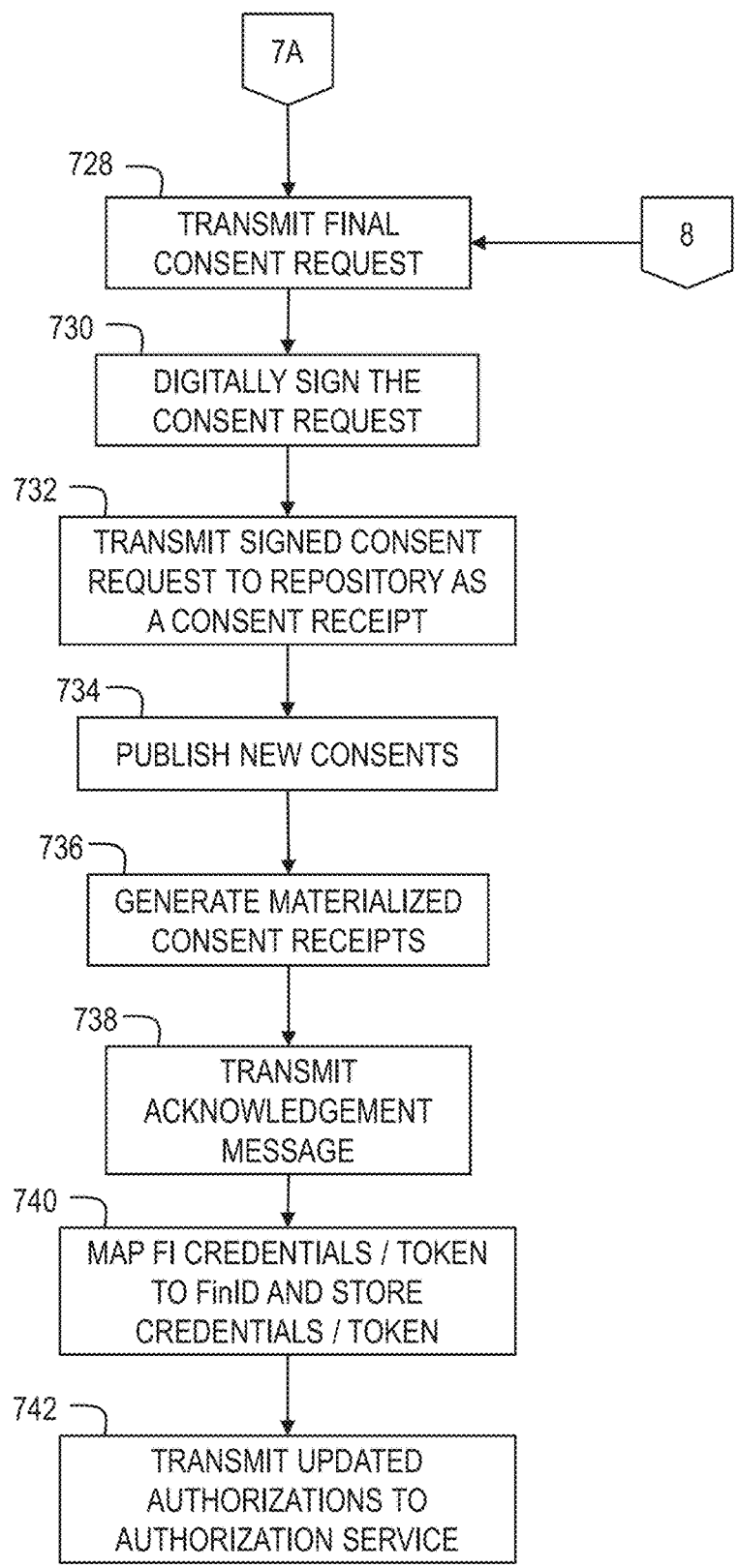

FIGS. 7A and 7B depict a flowchart illustrating an exemplary computer-implemented method 700 for creating data access consent to financial data of a customer, such as the customer 58, with the trust root server 50, and more particularly, the consent management system 68, in accordance with one embodiment of the present disclosure. The operations described herein may be performed in the order shown in FIGS. 7A and 7B or may be performed in a different order. Furthermore, some operations may be performed concurrently as opposed to sequentially. In addition, some operations may be optional.

The computer-implemented method 700 is described below, for ease of reference, as being executed by exemplary devices and components introduced with the embodiments illustrated in FIGS. 1-6. In one embodiment, the method 700 may be implemented by the trust root server 50 (shown in FIG. 2). In the exemplary embodiment, the method 700 relates to the receiving data access consent from the customer 58, for example, via the trust root server 50 and storing the consents in a database, such as the consent store or repository 70 (shown in FIG. 2). While operations within the method 700 are described below regarding the trust root server 50, the method 700 may be implemented on other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Referring to operation 702, the customer 58 connects to the trust root server 50. In one embodiment, the customer 58 connects to the trust root server 50 via a web application provided by one of trust root server 50, the financial institution 52, the TPPs 54 and 56, or the data access platform providers 60 and 62. Alternatively, the customer 58 may connect to the trust root server 50 in any manner that enables the creation of data access consents. At operation 704, the customer 58 may login to an account he or she previously created on the trust root server 50, for example, by providing login credentials associated with the customer's account. If the customer 58 has an account, the trust root server 50 authenticates the customer 58 via the authentication service 124 (shown in FIG. 3) at operation 706, and upon authentication, checks the authorization service 126 (shown in FIG.

3) for account permissions and authorizes the account based on the identified account permissions, at operation 708. Upon a successful authentication and authorization, the authentication service 124 returns the universal identifier (e.g., a FinID) that corresponds to the customer 58 at operation 710.

If the customer does not have a previously created account on the trust root server 50, the customer may provide a customer identifier (ID) to the trust root server 50 at operation 712. The trust root server uses the identity management system 120 (shown in FIG. 3) to match the customer ID to a universal identifier (e.g., a FinID) at operation 714. If the customer 58 does not have a customer ID or the identity management system 120 cannot find a corresponding FinID, the trust root server 50 allows the customer 58 to create an account, whereby the customer 58 is assigned a FinID, at operation 716.

After receiving the FinID, at operation 718, the trust root server 50 receives account information and/or login credentials from the customer 58, wherein the account information and/or login credentials are associated with a financial account of the customer 58. The trust root server retrieves financial account data and/or a token from the customer's financial institution at operation 720.

After receiving the account data and/or token, at operation 722, the trust root server 50 receives a consent request data submission from the customer 58, and more particularly, a computing device associated with the customer 58. More particularly, the trust root server 50 presents a consent request form to the customer 58. The customer 58 fills out the form, including providing one or more data access consents, which include one or more data scopes, recipient, application or service, duration or timeframe, etc. The consent request data submission is received by the consent management interface 114 (shown in FIG. 2). At operation 724, the consent management interface 114 identifies any existing consents stored in the consent store or repository 70 that include the same data scopes, recipient, application or service, duration or timeframe, etc. Any overlapping consents are returned to the consent management interface 114. At operation 726, the processor of the trust root server 50 reconciles any overlapping consents.

At operation 728, the processor of the trust root server 50 transmits a final consent request to the consent management interface 114. The final request includes the consent request data submission (reconciled, if applicable), which includes the new data scopes, recipient, application or service, duration or timeframe, etc. At operation 730, the digital signature engine 118 signs the consent request at the request of the consent management interface 114 and returns signed proof.

After the consent request is signed, at operation 732, the consent management interface 114 transmits the signed consent request and proof (and any metadata) to the consent store or repository 70 as a consent receipt. Likewise, the consent management interface 114 publishes the new consents via the consent distribution engine 116 (shown in FIG. 3) at operation 734. At operation 736, the consent distribution engine 116 generates one or more materialized consent receipts, which are stored on the consent store or repository 70.

At operation 738, the consent management interface 114 transmits an acknowledgement message to the processor of the trust root server 50 indicating that the new customer data access consent has been stored and published. At operation 740, the trust root server 50 maps the customer's financial institution credentials and/or token to the customer's FinID in the identity management system 120, and stores the credentials in a database or token vault. At operation 742, the consent store or repository 70 transmits the updated authorizations from the consent request to the authorization service 126.

Figure 8:
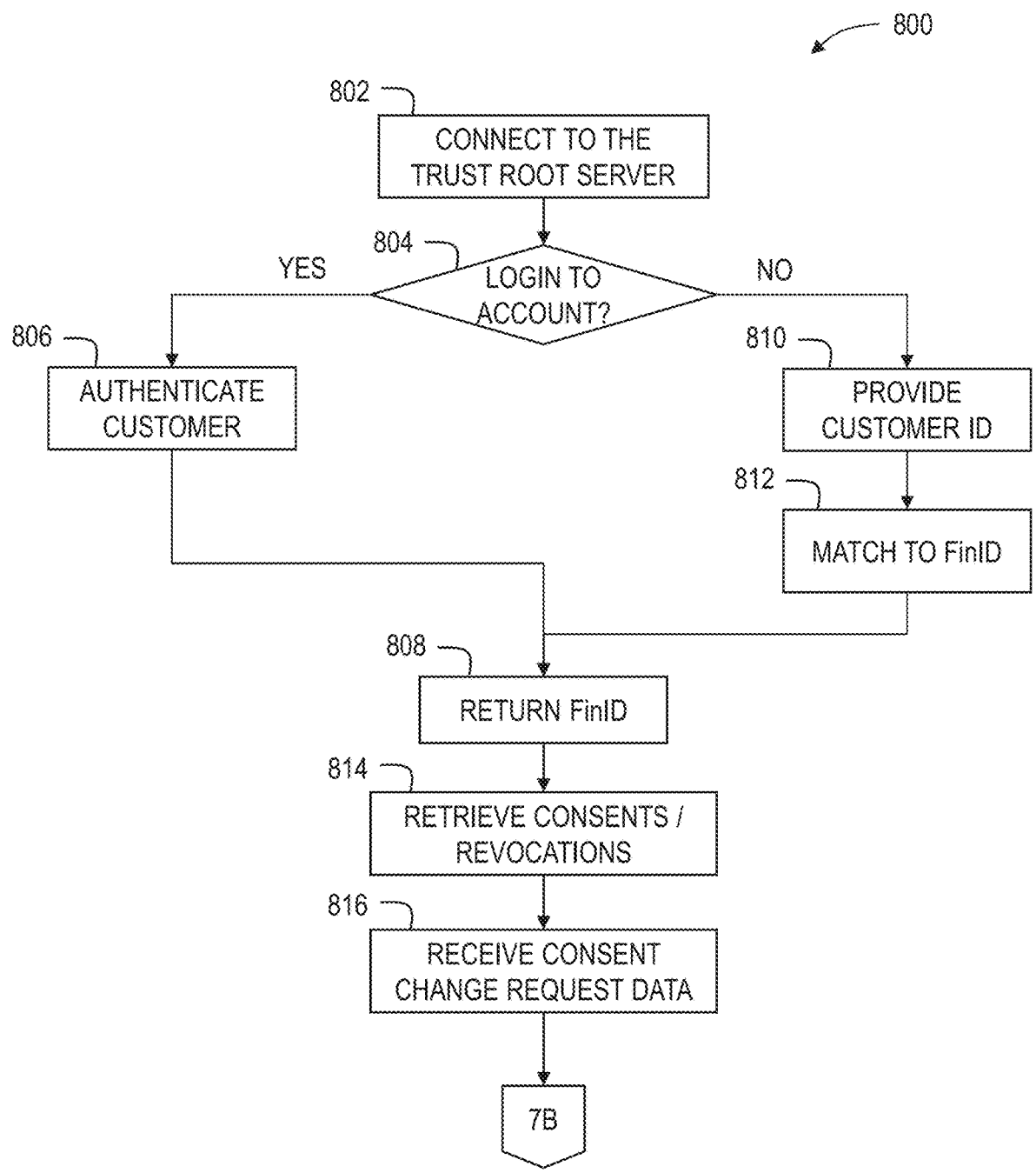
FIG. 8 is a flowchart illustrating an exemplary computer-implemented method for updating data access consents for financial data of a customer, in accordance with an aspect of the present disclosure.

FIG. 8 is a flowchart illustrating an exemplary computer-implemented method 800 for updating data access consents for financial data of a customer, such as the customer 58, with the trust root server 50, and more particularly, the consent management system 68, in accordance with one embodiment of the present disclosure. The operations described herein may be performed in the order shown in FIG. 8 or may be performed in a different order. Furthermore, some operations may be performed concurrently as opposed to sequentially. In addition, some operations may be optional.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

It is noted that the method 800 calls the consent request generation steps of the method 700 after the changed consents (change set) has been identified.

Referring to operation 802, the customer 58 connects to the trust root server 50. In one embodiment, the customer 58 connects to the trust root server 50 via a web application provided by one of trust root server 50, the financial institution 52 (FI), the TPPs 54 and 56, or the data access platform providers 60 and 62. Alternatively, the customer 58 may connect to the trust root server 50 in any manner that enables the creation of data access consents. At operation 804, the customer 58 may login to an account he or she previously created on the trust root server 50. The trust root server 50 authenticates the customer 58 via the authentication service 124 at operation 806. Upon a successful authentication, the authentication service 124 returns the universal identifier (e.g., a FinID) that corresponds to the customer 58 at operation 808. If the customer does not log into a previously created account on the trust root server 50, the customer (or FI, TPP, etc.) may provide a customer ID to the trust root server 50 at operation 810. The trust root server uses the identity management system 120 to match the customer ID to a universal identifier (e.g., a FinID) at operation 812.

After receiving the FinID, at operation 814, the trust root server 50 retrieves one or more consents and revocations from the consent store or repository 70. More particularly, if the customer 58 is logged into his or her account on the trust root server 50, the trust root server 50 may retrieve all consents and revocations from the consent store or repository 70. However, if the customer ID is received from an FI, TPP, or data access platform providers, the trust root server 50 may retrieve only those consents and revocations from the consent store or repository 70 that are associated with the respective FI, TPP, or data access platform providers.

After receiving the one or more consents and revocations, at operation 816, the trust root server 50 receives a consent change request data submission from the customer 58 for at least one of the retrieved consents and revocations. For example, the trust root server 50 presents a consent change action form to the customer 58, wherein the consent change form is associated with one of the retrieved consents and revocations. The customer 58 fills out the form, including providing changes to one or more data scopes, recipient, application or service, duration or timeframe, etc. associated with one of the retrieved consents and revocations. The consent change request data is then processed as a new consent request in accordance with the method 700. In particular, the consent change request data is processed starting at operation 728, as discussed above in method 700.

Figure 9:
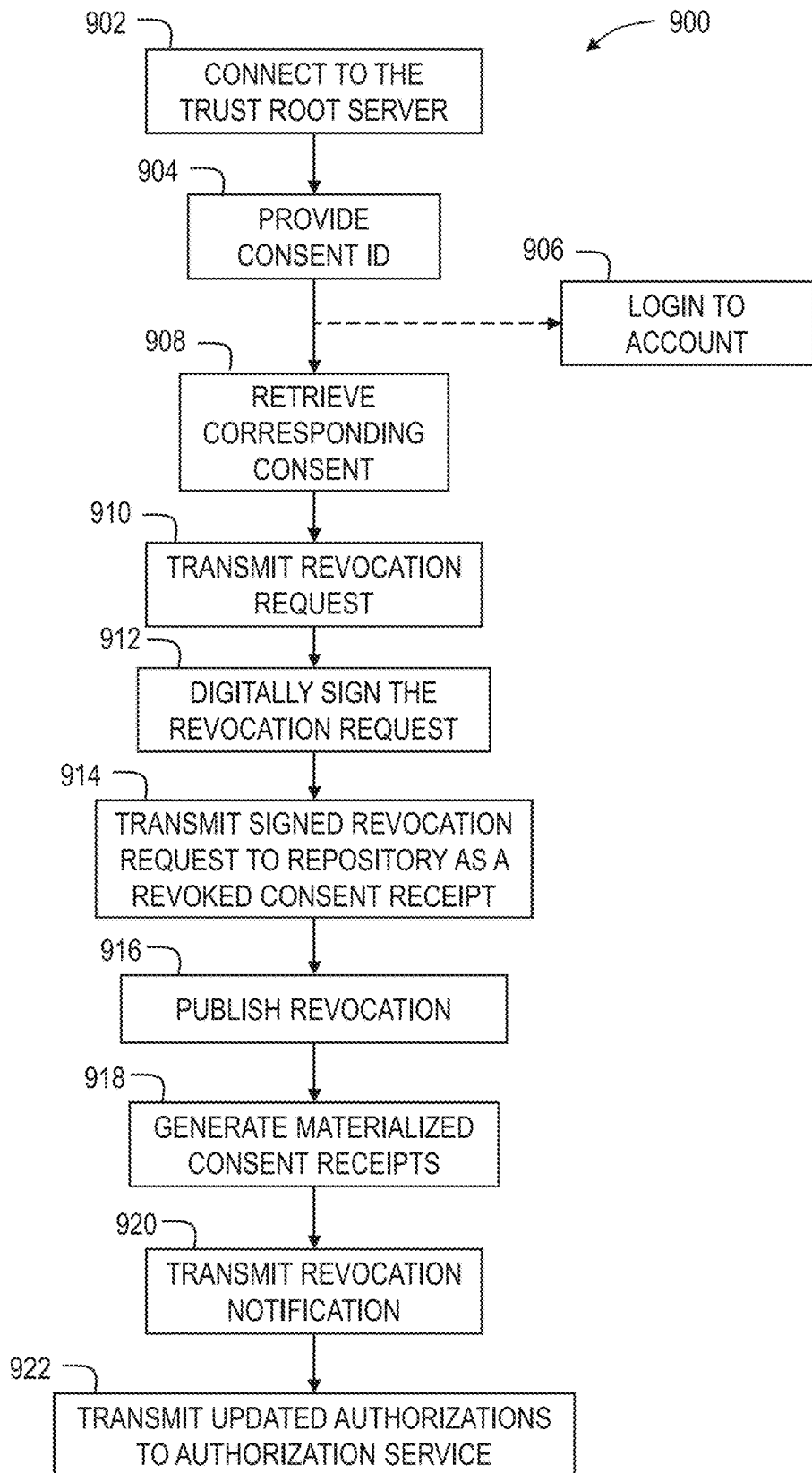
FIG. 9 is a flowchart illustrating an exemplary computer-implemented method for revoking data access consents for financial data of a customer, in accordance with an aspect of the present disclosure.

FIG. 9 is a flowchart illustrating an exemplary computer-implemented method 900 for revoking data access consents for financial data of a customer, such as the customer 58, with the trust root server 50, and more particularly, the consent management system 68, in accordance with one embodiment of the present disclosure. The operations described herein may be performed in the order shown in FIG. 9 or may be performed in a different order. Furthermore, some operations may be performed concurrently as opposed to sequentially. In addition, some operations may be optional.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Referring to operation 902, the customer 58 connects to the trust root server 50 to revoke a consent. At operation 904, a consent ID is provided, for example, by the customer 58, or via a revocation request redirect from one of the trust root server 50, the financial institution 52 (FI), the TPPs 54 and 56, or the data access platform providers 60 and 62. The consent ID is associated with and identifies an existing consent and/or consent receipt. At operation 906, the customer 58 may optionally login to an account he or she previously created on the trust root server 50.

After receiving the consent ID, at operation 908, the trust root server 50 retrieves the corresponding consent from the consent store or repository 70. At operation 910, a processor of the trust root server 50 transmits a revocation request to the consent management interface 114. The revocation request includes an indication that the corresponding consent is to be revoked in its entirety. At operation 912, the digital signature engine 118 signs the revocation request at the request of the consent management interface 114 and returns signed proof After the revocation request is signed, at operation 914, the consent management interface 114 transmits the signed revocation request to the consent store or repository 70 as a revoked consent receipt. Likewise, the consent management interface 114 publishes the revocation via the consent distribution engine 116 at operation 916. At operation 918, the consent distribution engine 116 generates one or more materialized revoked consent receipts, which are stored on the consent store or repository 70. At operation 920, the consent distribution engine 116 transmits a notice of revocation to the trust root server 50. At operation 922, the consent store or repository 70 transmits the updated authorizations from the revocation request to the authorization service 126.

Figure 10:
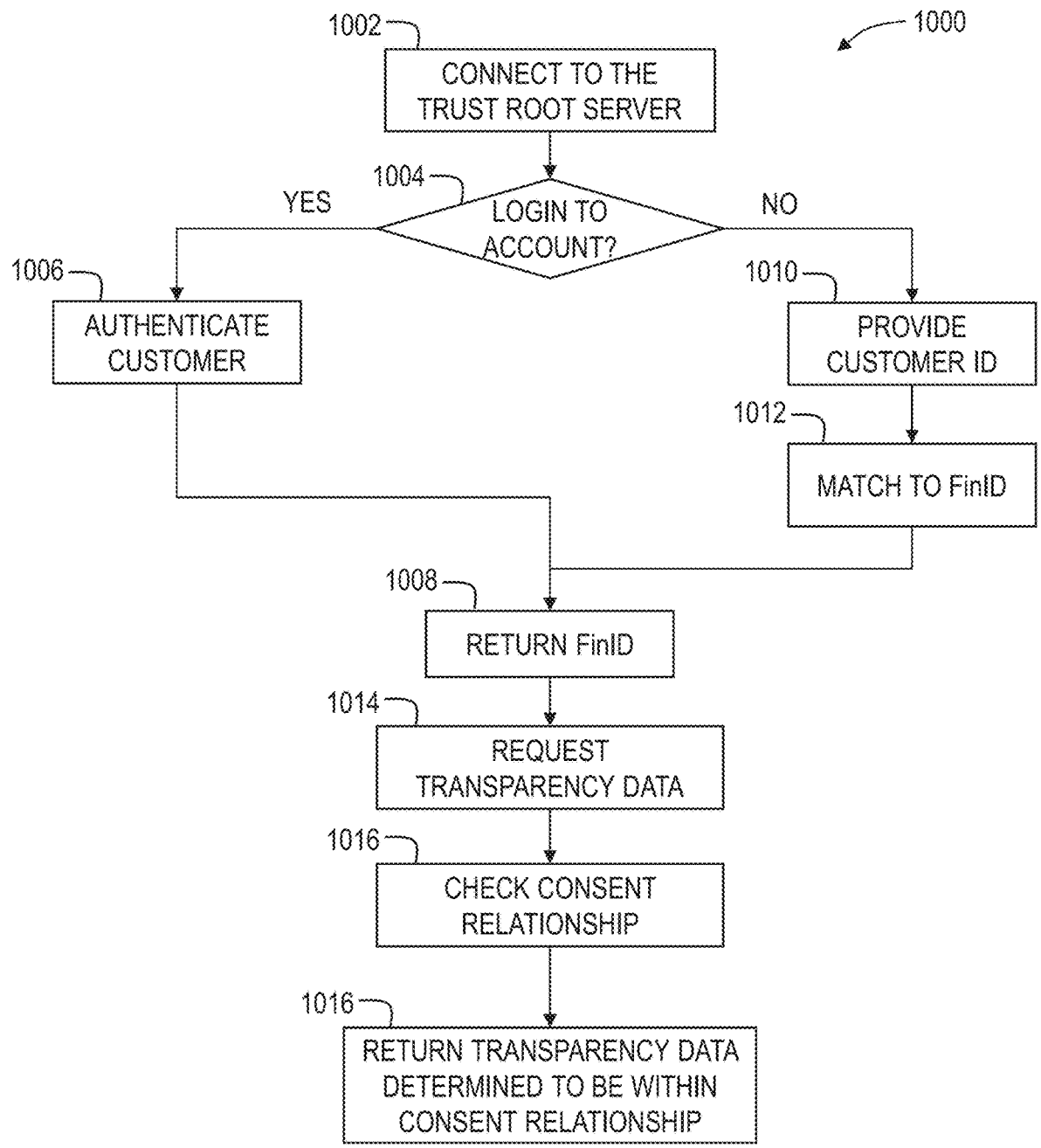
FIG. 10 is a flowchart illustrating an exemplary computer-implemented method for data access transparency reporting for use of financial data of a customer, in accordance with an aspect of the present disclosure.

FIG. 10 is a flowchart illustrating an exemplary computer-implemented method 1000 for data access transparency reporting for use of financial data of a customer, such as the customer 58, with the trust root server 50, in accordance with one embodiment of the present disclosure. The operations described herein may be performed in the order shown in FIG. 10 or may be performed in a different order. Furthermore, some operations may be performed concurrently as opposed to sequentially. In addition, some operations may be optional.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Referring to operation 1002, the customer 58 connects to the trust root server 50. In one embodiment, the customer 58 connects to the trust root server 50 via a web application provided by one of trust root server 50, the financial institution 52 (FI), the TPPs 54 and 56, or the data access platform providers 60 and 62. Alternatively, the customer 58 may connect to the trust root server 50 in any manner that enables communication between the customer 58 and the trust root server 50.

At operation 1004, the customer 58 may login to an account he or she previously created on the trust root server 50. The trust root server 50 authenticates the customer 58 via the authentication service 124 at operation 1006. Upon a successful authentication, the authentication service 124 returns the universal identifier (e.g., a FinID) that corresponds to the customer 58 at operation 1008. If the customer 58 does not log into a previously created account on the trust root server 50, the customer 58 (or FI, TPP, etc.) may provide a customer ID to the trust root server 50 at operation 1010. The trust root server 50 uses the identity management system 120 to match the customer ID to a universal identifier (e.g., a FinID) at operation 1012.

After receiving the FinID, at operation 1014, the trust root server 50 queries the identity management system 120 for transparency data. At operation 1016, the identity management system 120 communicates with the consent management interface 114 to ensure that a consent relationship exists for a respective data recipient if the customer 58 is not logged into his or her account. That is, if the request for transparency reporting is coming from the customer 58 via one of the financial institution 52, the TPPs 54 and 56, or the data access platform providers 60 and 62, then only the transparency data that are associated with the respective FI, TPP, or data access platform providers will be returned at operation 1018. If the customer 58 is logged into his or her account, the identity management system 120 returns all requested transparency data at operation 1018.

It is noted that if the customer 58 does not authenticate, then as the query is being executed, only data during valid consents will be returned. If a revocation has occurred which removes all consents, then any future transparency data will not be returned unless the customer 58 logs into his or her account on the trust root server 50.

In another embodiment, a financial institution 52 (FI), TPP 54 or 56, or data access platform providers 60 or 62 may wish to retrieve a transparency report related to one or more of its customers, such as the customer 58. In such an embodiment, the identity management system 120 may receive a FinID request directly from the financial institution 52 (FI), TPP 54 or 56, or data access platform provider 60 or 62. The FinID request may include a customer ID. The identity management system 120 communicates with the consent management interface 114 to ensure that a consent relationship exists for the respective data recipient and the FinID of the customer 58. If a consent relationship exists, the identity management system 120 returns the FinID to the respective data recipient. After receiving the FinID, the data recipient queries the identity management system 120 for transparency data. The query includes the FinID and the data recipient ID. The identity management system 120 then returns the requested transparency data to the data recipient.

Figure 11:
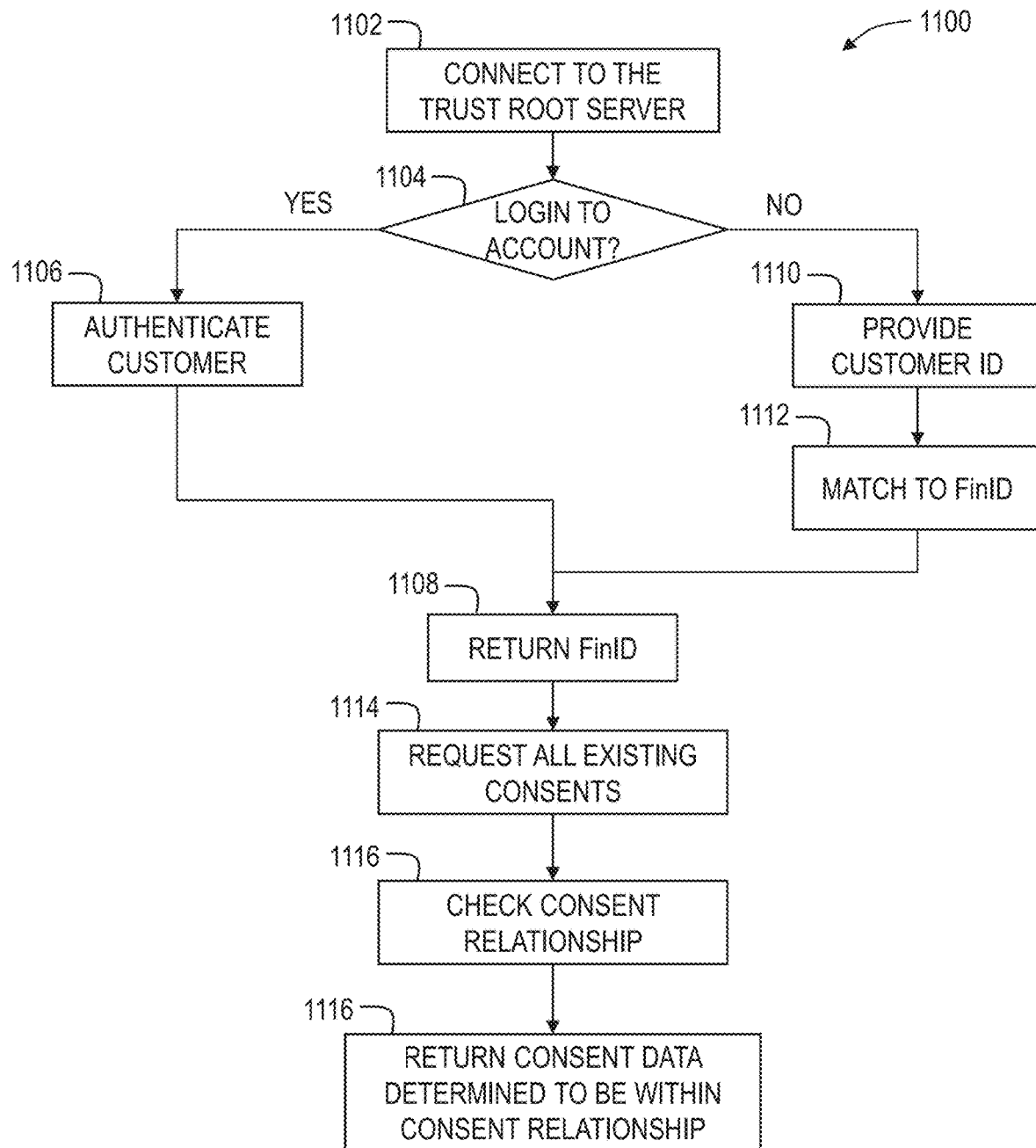
FIG. 11 is a flowchart illustrating an exemplary computer-implemented method for customer consent inspection with the trust root server, in accordance with an aspect of the present disclosure.

FIG. 11 is a flowchart illustrating an exemplary computer-implemented method 1100 for customer consent inspection with the trust root server 50, in accordance with one embodiment of the present disclosure. The operations described herein may be performed in the order shown in FIG. 11 or may be performed in a different order. Furthermore, some operations may be performed concurrently as opposed to sequentially. In addition, some operations may be optional.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Referring to operation 1102, the customer 58 connects to the trust root server 50. In one embodiment, the customer 58 connects to the trust root server 50 via a web application provided by one of trust root server 50, the financial institution 52 (FI), the TPPs 54 and 56, or the data access platform providers 60 and 62. Alternatively, the customer 58 may connect to the trust root server 50 in any manner that enables communication between the customer 58 and the trust root server 50.

At operation 1104, the customer 58 may login to an account he or she previously created on the trust root server 50. The trust root server 50 authenticates the customer 58 via the authentication service 124 at operation 1106. Upon a successful authentication, the authentication service 124 returns the universal identifier (e.g., a FinID) that corresponds to the customer 58 at operation 1108. If the customer 58 does not log into a previously created account on the trust root server 50, the customer 58 (or FI, TPP, etc.) may provide a customer ID to the trust root server 50 at operation 1110. The trust root server 50 uses the identity management system 120 to match the customer ID to a universal identifier (e.g., a FinID) at operation 1112.

After receiving the FinID, at operation 1114, the trust root server 50 queries the identity management system 120 for all consents. At operation 1116, the identity management system 120 communicates with the consent management interface 114 to ensure that a consent relationship exists for a respective data recipient if the customer 58 is not logged into his or her account. That is, if the request for consents is coming from the customer 58 via one of the financial institution 52, the TPPs 54 and 56, or the data access platform providers 60 and 62, then only the consents data that are associated with the respective FI, TPP, or data access platform providers will be returned at operation 1118. If the customer 58 is logged into his or her account, the identity management system 120 returns all requested consents data at operation 1118.

It is noted that if the customer 58 does not authenticate, then as the query is being executed, only data during valid consents will be returned. If a revocation has occurred which removes all consents, then any future consents or revocation data will not be returned unless the customer 58 logs into his or her account on the trust root server 50.

In another embodiment, a financial institution 52 (FI), TPP 54 or 56, or data access platform providers 60 or 62 may wish to retrieve consents data related to one or more of its customers, such as the customer 58. In such an embodiment, the identity management system 120 may receive a FinID request directly from the financial institution 52 (FI), TPP 54 or 56, or data access platform provider 60 or 62. The FinID request may include a customer ID. The identity management system 120 communicates with the consent management interface 114 to ensure that a consent relationship exists for the respective data recipient and the FinID of the customer 58. If a consent relationship exists, the identity management system 120 returns the FinID to the respective data recipient. After receiving the FinID, the data recipient queries the identity management system 120 for consents data. The query includes the FinID and the data recipient ID. The identity management system 120 then returns the requested consents data to the data recipient.

Exemplary Computer Systems

Figure 12:
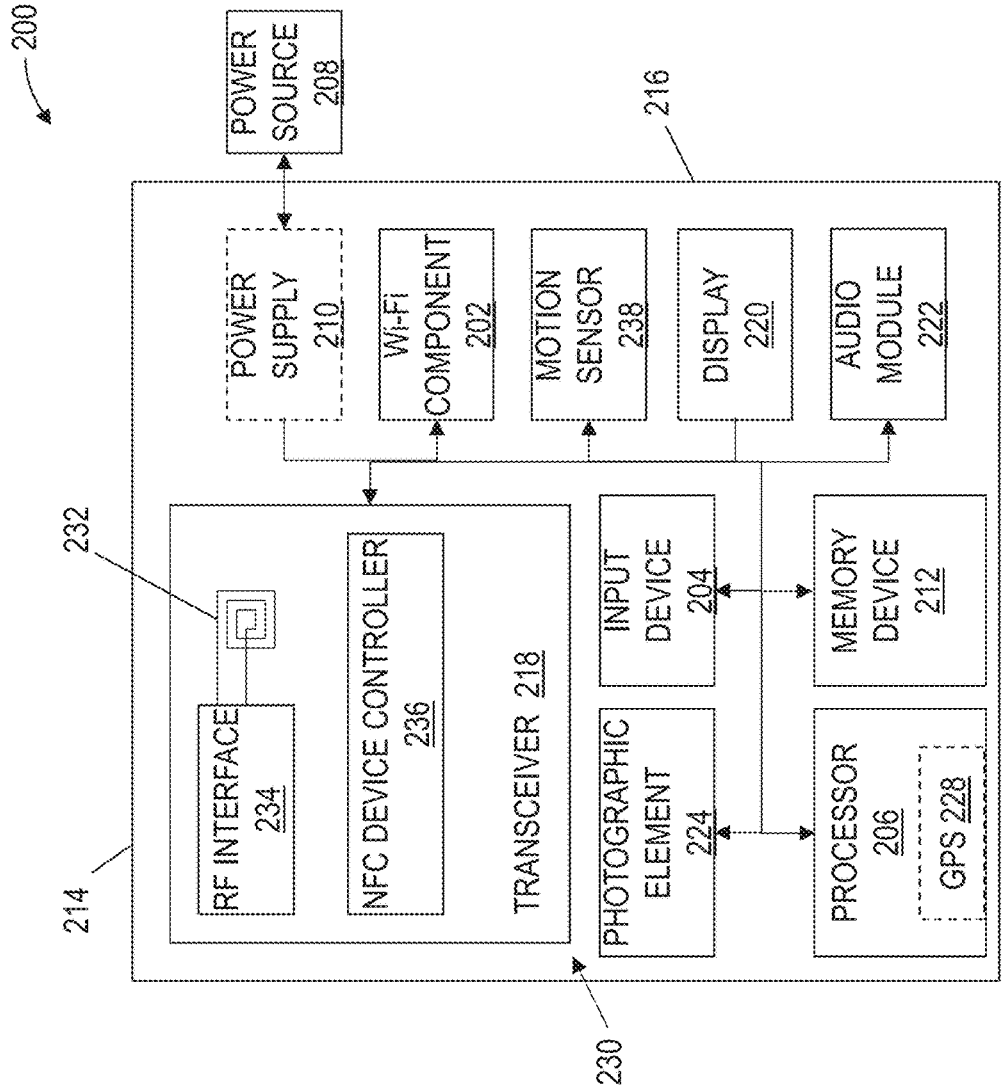
FIG. 12 is an example configuration of a user computing device for use in the trust root system of FIG. 1.

FIG. 12 is an example configuration of a user computing device 200, such as the customer device 20 (shown in FIG. 1), that may be operated by a user, such as the customer 58 (shown in FIG. 2). In the exemplary embodiment, the computing device 200 is a computing device configured to connect to the communication network 22 (shown in FIG. 1). Via the communication network 22, the computing device 200 may connect to one or more of the database server 12, the client devices 14, 16, and 18, and any other computing devices, such as other customer computing devices.

In the exemplary embodiment, the computing device 200 generally includes a processor 206, a memory device 212, a transceiver 218 (or a wireless communication device), and a photographic element 224. In addition, the computing device 200 includes an integrated Wi-Fi component 202 (e.g., implementing the Institute of Electrical and Electronics/IEEE 802.11 family of standards), an input device 204, a display 220, and an audio module 222. Moreover, the computing device 200 optionally includes an internal power supply 210 (e.g., a battery or other self-contained power source) to receive power, or alternatively, in some embodiments, the computing device 200 may include an external power source 208. Optionally, the computing device 200 may include a motion sensor 238.

The processor 206 includes one or more processing units (e.g., in a multi-core configuration) specially programmed for executing computer readable instructions. The instructions may be executed within a variety of different operating systems (OS) on the computing device 200. More specifically, the instructions may cause various data manipulations on data stored in the memory device 212 (e.g., create, read, write, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). The memory device 212 is any device allowing information, data, the executable instructions, and/or written works to be stored and retrieved. The memory device 212 includes one or more computer readable media.

Because the computing device 200 may be widely deployed, it may be impractical to manually update software for each computing device 200. Therefore, the environment 10 may provide a mechanism for automatically updating the software on the computing device 200. For example, an updating mechanism may be used to automatically update any number of components and their drivers, both network and non-network components, including system level (OS) software components. In some embodiments, the computing device 200 components are dynamically loadable and unloadable; thus, they may be replaced in operation without having to reboot the OS.

A location of the computing device 200 can be obtained through conventional methods, such as a location service (e.g., global positioning system (GPS) service) in the computing device 200, "ping" data that includes geotemporal data, from cell location register information held by a telecommunications provider to which the computing device 200 is connected, and the like. For example, in one suitable embodiment, an optional GPS chip 228 can be part of or separate from the processor 206 to enable the location of the computing device 200 to be determined.

The Wi-Fi component 202 (broadly, a communication interface) may be communicatively connectable to a remote device such as a wireless modem/router (not shown), the communication network 22 (shown in FIG. 1), the database server 12 (shown in FIG. 1), and/or the client devices 14, 16, and 18 (shown in FIG. 1). The Wi-Fi component 202 may include, for example, a wireless or wired network adapter or a wireless data transceiver for use with Wi-Fi (e.g., implementing the Institute of Electrical and Electronics/IEEE 802.11 family of standards), Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMAX) and the like.

Stored in the memory device 212 are, for example, computer readable instructions for providing a user interface (not shown), to the user via the display 220 and, optionally, receiving and processing input from the input device 204. A user interface may include, among other possibilities, a web browser and a client application. Web browsers enable users to view and interact with media and other information typically embedded on a web page or a website.

The photographic element 224 may include a camera or other optical sensor and lens combination capable of generating a video signal and capturing an image, iris scan, and the like. In various embodiments, the photographic element 224 may be integrated in a housing or body, such as a housing 214 of the computing device 200. When the photographic element 224 captures an image or otherwise generates image data (e.g., video data), the photographic element 224 may store the image data in a data file, either in a raw or compressed format, in the memory device 212.

In some embodiments, the motion sensor 238 may include one or more sensor elements that facilitate detecting a person's presence. For example, in an embodiment, the motion sensor 238 detects when a user moves or raises the computing device 200. Upon detection of such motion, the photographic element 224 may begin capturing images (e.g., still or video images), the transceiver 218 may be activated, and/or the audio module 222 may begin capturing audio. The motion sensor 238 may be operatively coupled to the photographic element 224 such that the user's presence may be detected by detecting motion using the photographic element 224. The motion sensor 238 may include, for example, and without limitation, sensor elements such as a passive infrared sensor, an ambient light sensor, and the like.

In the example embodiment, the display 220 can include, for example, and without limitation, a liquid crystal display (LCD), an organic light emitting diode (OLED) display, or an "electronic ink" display. In some embodiments, a single component such as a touch screen may function as both an output device (e.g., the display 220) and the input device 204. As such, the display 220 may optionally include a touch controller for support of touch capability. In such embodiments, the computing device 200 may detect a user's presence by detecting that the user has touched the display 220 of the computing device 200.

The audio module 222 may include, for example, and without limitation, a speaker and related components capable of broadcasting streaming and/or recorded audio and may also include a microphone. The microphone facilitates capturing audio through the computing device 200.

In the example embodiment, the computing device 200 includes the housing 214 at least partly (and more preferably, at least substantially or entirely) enclosing the components described above. In addition, the computing device 200 includes circuitry 230 configured to communicate with the communication network 22 (shown in FIG. 1) and/or other computing devices. The circuitry 230 may include, for example, leads, connectors, NFC-enabled circuitry, Wi-Fi-enabled circuitry, and photographic element circuitry. The housing 214 is preferably configured to seal the circuitry 230, which is susceptible to degradation from the ambient environment. In one embodiment, the circuitry 230 is hermetically sealed in the housing 214. For example, in one embodiment, the circuitry 230 is completely and permanently encased within the housing 214. In other words, the housing 214 and the circuitry 230 are intended to remain as a single, inseparable unit throughout the life of the computing device 200. It is understood that the housing 214 can be formed separately from the circuitry 230 and that the circuitry 230 can be placed into and sealed within the housing 214 in a separate operation. It is also understood that the housing 214 can be oversized with respect to the circuitry 230 so that the circuitry 230 can be placed loosely into the housing 214. In another embodiment, the circuitry 230 can be selectively, sealingly enclosed within the housing 214, where the housing 214 includes a closure 216 removably attached to a body of the housing 214.

The housing 214 is fabricated from a suitably selected material that facilitates inhibiting the effect the material has on the signal being emitted from, for example, the transceiver 218 and/or the Wi-Fi component 202 and passing through the housing material. For example, and without limitation, suitable materials from which the housing 214 may be fabricated include polyethylene, propylene, isoprene, and butylenes (i.e., polyolefins). In other embodiments, the housing 214 is fabricated from any material that enables the computing device 200 to function as described herein, such as metals, etc.

In one embodiment, the transceiver 218 includes an antenna 232. The antenna 232 includes a looped wire configured to transmit radio signals when current flows through the looped wire. The antenna 232 is any size, shape, and configuration that is suitable for transmitting signals as described herein. For example, the antenna 232 is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 232 generates a magnetic field when it vibrates at a selected frequency. Specifically, the antenna 232 is configured to vibrate at a frequency of about 13.56 MHz, which is suitable for use in a near field communication (NFC) system.

In the example embodiment, the antenna 232 transmits radio signals to and receives radio signals from other wireless-enabled computing devices, for example, another mobile device, a merchant point-of-sale (POS) terminal (not shown), and/or any other components used in wireless systems. In NFC systems, for example, at least one NFC component generates a magnetic field to inductively transfer currents and, thereby, exchange signals and information with other NFC components positioned within the magnetic field. In one example embodiment, the antenna 232 functions as an NFC component to send and receive signals. The antenna 232 is configured to transmit radio signals to NFC components positioned within the magnetic field of the antenna 232, such as when the computing device 200 is located within a predetermined distance of a POS terminal. Accordingly, the magnetic field generated by the antenna 232 defines the active range of the computing device 200. Additionally, the antenna 232 receives radio signals from NFC components when the antenna 232 is positioned within the magnetic field of the NFC components.

The transceiver 218 also includes a radio frequency (RF) interface 234 and an NFC device controller 236. The RF interface 234 and the NFC device controller 236 are powered by the power source 208, and in some embodiments, the internal power supply 210 and/or the display 220. In addition, the processor 206 and the memory device 212 are powered in the same manner. The RF interface 234 is configured to receive and transmit RF signals through the antenna 232. The NFC device controller 236 is configured to process the received RF signals and to generate signals to be transmitted by the RF interface 234. The memory device 212 is configured to store data associated with transmitting and receiving the RF signals. The NFC device controller 236 is coupled in communication with the processor 206.

In some embodiments, the computing device 200 may be connected to one or more peripheral devices (not shown). That is, the computing device 200 may communicate various data with one or more peripheral devices. For example, the computing device 200 may communicate with one or more peripheral devices through the Wi-Fi component 202, the transceiver 218, or other suitable means.

Figure 13:
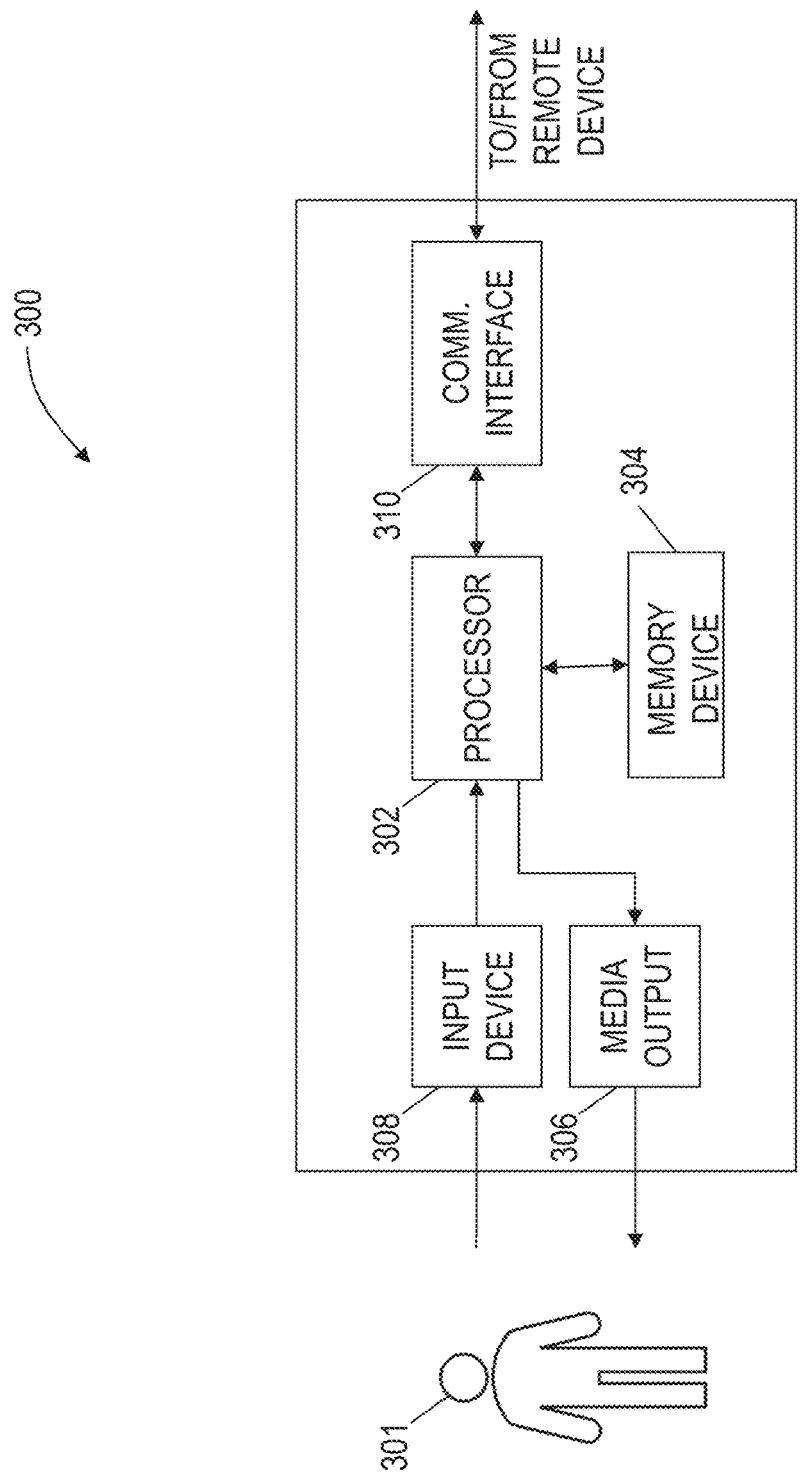
FIG. 13 is an example configuration of a computing system for use in the trust root system of FIG. 1.

FIG. 13 is an example configuration of a computing system 300 operated by a user 301. In some embodiments, the computing system 300 is equivalent to the client devices 14, 16, and 18, for example. In the example embodiment, the computing system 300 includes a processor 302 for executing instructions. In some embodiments, executable instructions are stored in a memory device 304. The processor 302 includes one or more processing units, for example, a multi-core processor configuration. The memory device 304 is any device allowing information such as executable instructions and/or written works to be stored and retrieved. The memory device 304 includes one or more computer readable media.

In the example embodiment, the processor 302 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 300 may be widely deployed, it may be impractical to manually update software for each computing system 300. Therefore, the system 10 may, in some embodiments, provide a mechanism for automatically updating the software on the computing system 300. For example, an updating mechanism may be used to automatically update any number of components and their drivers, both network and non-network components, including system level (OS) software components. In some embodiments, the computing system 300 components are dynamically loadable and unloadable; thus, they may be replaced in operation without having to reboot the OS.

The computing system 300 also includes at least one media output component 306 for presenting information to the user 301. The media output component 306 is any component capable of conveying information to the user 301. In some embodiments, the media output component 306 includes an output adapter such as an audio adapter and/or a video adapter. An output adapter is operatively coupled to the processor 302 and operatively connectable to an output device, such as; (i) an audio output device including, for example, a speaker or headphones; and/or (ii) a display device including, for example, a liquid crystal display (LCD), organic light emitting diode (OLED) display, or "electronic ink" display.

In some embodiments, the computing system 300 includes an input device 308 for receiving input from the user 301. The input device 308 may include, for example, an audio input device, such as a microphone. In some embodiments, the input device 308 may include, for example, one or more of a touch sensitive panel, a touch pad, a touch screen, a stylus, a position detector, a keyboard, a pointing device, and a mouse. A single component, such as a touch screen, may function as both an output device of the media output component 306 and the input device 308.

The computing system 300 may also include a communication interface 310, which is communicatively connectable to one or more remote devices, such as the network 22 (shown in FIG. 1) and/or the database server 12 (shown in FIG. 1). The communication interface 310 may include, for example, a wireless or wired network adapter or a wireless data transceiver for use with Wi-Fi (e.g., implementing the Institute of Electrical and Electronics/IEEE 802.11 family of standards), Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMax) and the like.

In one embodiment, stored in the memory device 304 are, for example, computer readable instructions for transmitting data access requests via the communication interface 310 and, optionally, receiving and processing input from the input device 308.

Exemplary Identity Certainty System

This portion of the disclosure broadly discloses methods and systems for identity corroboration and determination of an identity certainty score via a consented identity as a service (CIDaaS) model. More specifically, a specially programmed computer, such as the database server 12 (shown in FIG. 1), is configured to: i) retrieve or otherwise access customer data that can be associated with a customer's identity; ii) apply a plurality of machine learning, statistical inference, and/or deep learning coding or modeling techniques to the customer data; and iii) determine an identity certainly score using an ensemble model.

In one embodiment, CIDaaS provides a scalable platform for evolving identity corroboration. This service includes active Know Your Customer (KYC) integrations covering financial services and FinTech clients in lending, payroll, online payment, and financial management. CIDaaS is a zero-knowledge proof architecture. Zero-knowledge proofs include any proofs of questions that can be answered and verified by a cryptographic signature of a data issuer without disclosing underlying information more than the minimum necessary to answer the questions. Typical examples include questions that have a binary answer. By way of example, one such question can be whether a person is over age twenty-one (21) (e.g., for purposes of being able to consume alcohol). In this example, the answer is "yes" regardless of whether the person is twenty-one (21), twenty-three (23), or forty-five (45), and the answer can be verified as "yes" without disclosing the person's identity, birthdate, driver's license number, social security number, or any of a variety of other data that may become available when a driver's license is presented to verify age. In this example, the state of issuance of the person's driver's license (or some other trustworthy and credentialed entity entrusted with knowledge of the age of the person) could cryptographically sign and thus verify the "yes" answer, and the bar or restaurant serving alcohol could provide alcohol to the person with assurance that the person is over twenty-one (21) and can legally consume alcohol.

The data science behind CIDaaS is extraordinarily robust and predictive. The CIDaaS identity certainty score is the result of an ensemble model based on predictive and reinforcement learning methodologies, N-Dimensional Embedding, underlying Markovian stochastic models, statistical methods, and neural network architectures. The platform is capable of scoring whether an action in the customer-merchant-financial partner triumvirate is an outlier and consequently suspicious.

CIDaaS allows implementation to be agnostic to the technology used in identity decentralization and consent aggregation because the most important considerations are that the highest standard of permissioned and provenance-tracked data be used, a broad and differentiated dataset be utilized, and finally, there exists an algorithmic rigor in developing identity certainty. The combination of a broad array of CRA trusted, customer-permissioned open-banking data with the CIDaaS model using this data to arrive at an identity certainty score enables the ability to offer a solid affirmation of identity.

In an embodiment, CIDaaS is based on a multidimensional matching and prediction engine that offers all parties (merchant, customer, and financial institution) equal opportunities to validate identity and offer data that certifies identity. Data collected is both static (i.e., traditional identity attributes like SSN) and dynamic (i.e., integrated account balance data), offering further unique identifiers and the ability to deliver not only certainty of identity, but when integrated into products for lenders—credit worthiness—or when integrated into products for customers—analytics on spending/saving history and prescriptions for improvement.

In one embodiment, the identity certainty score is the result of the CIDaaS ensemble model. This identity certainty score is an ensemble of the outputs of four (4) different models, which include the following: Direction, Cadence; Gradient, and Markov Decision Process Degrees. Each of these models cover a component of the identity certainty space and come complete with numerous metrics that are utilized to arrive at the model outputs. Furthermore, as is shown in Table 4 below, each model is utilized in other applications.

TABLE 4

| | |
|---|---|
| Direction | N-dimensional embedding that resolves the static picture of a parameter. |
| | Models may output the direction, distance, or importance of the parameter in relation to other instances of the same parameter. |
| | Used in: |
| | Type of Name |
| | Name Matching |
| | SSN Matching |
| | Intelligent Real-Time Payment |
| Cadence | Time-series/history models reviewing the dynamics of a parameter over time |
| | Models may output the cadence, seasonality, or temporal patterning of a parameter. |
| | Used in: |
| | Income Stream Classifier |
| | Verification of Income |
| | Spend Forecasting |
| | Balance Forecasting |
| | Cash Flow Features |
| | Address Learning |
| Gradient | Probabilistic models reviewing the likelihood of parameters next state spaces. |
| | Models may output the frequency or recency of a parameter. |
| | Used in: |
| | Normalized Payee |
| | Type of Name |
| | Entity Embedding |
| | Entity Identification |
| | Entity Resolution |
| | Entity Categorization |
| Markov Decision Process Degrees | Anomaly detection models reviewing the clustering or change of statistical outliers (fraud) in a model. |
| | Models may output the clustering, degrees of freedom, or degrees of variance of a parameter. |
| | Used in: |
| | Tax Identification |
| | Income Field Categorization |
| | Account Name Matching |
| | Address Extraction |
| | Account Owner Name Matching |

FIG. 14A depicts a list of some of the most common formulas for calculating metrics from the direction model 1510; FIG. 14B depicts a list of some of the most common formulas for calculating metrics from the cadence model 1512; FIG. 14C depicts a list of some of the most common formulas for calculating metrics from the gradient model 1508; and FIG. 14D depicts a list of some of the most common formulas for calculating metrics from the Markov decision process (MDP) degrees model 1506. It is noted that each of the listed formulas are depicted by way of example and not by way of limitation. Accordingly, the listed formulas are, therefore, not limiting.

As described above, each of the model outputs resolve a unique and important understanding of the collaborative identity certainty space (e.g., statics, dynamics, outlier, clustering, and probabilistic). Furthermore, each of the model outputs may be situationally important given the results of the calculated metrics. The model outputs may be weighted, for example, where the weighting is based in set theory. The CIDaaS permutation ensembled weights 1514 (shown in FIG. 15) include the following: Closure, Associativity, Identity, and Invertibility.

Closure is a weighting based on set closure by all operations, i.e., where any perturbation of an operation recreates a member of the set. (e.g., the set of positive real numbers cannot be closed by subtraction, because subtraction can create negative numbers).

Associativity is a weighting that identifies whether it is possible to replace any of the expressions in logical proofs. If any of the expressions of model outputs can be logically replaced, the associativity weighting serves to show that the expressions are functionally equivalent within the framework of identity certainty.

Concerning the identity weighting, if it can be shown that there is an immutable item or items within the set, such that an operator, and the immutable item or matrices of items returns the item, then the weighting can be said to have a high degree of identity. The degree of orthogonality can also be related to identity, where the relationship is in inverse proportion to the identity.

Invertibility is a weighting that mathematically resolves a degree to which a model output is able to undo an effect of combination with another element. This inversion of a model output in the ensemble is useful in that it explores the entire mirror-image space of the model output and gauges its relative applicability.

Results of the modelled output of cadence, MDP degrees, gradient, and direction from all entities in a zero-knowledge proof identity collaboration, weighted by set-theory parameters, are a risk score and an identity protection score. The risk score and the identity protection score are run through a continuous optimization of their state space, action, KYC, and identity learning to resolve an identity certainty score as is detailed in FIG. 15.

Figure 15:
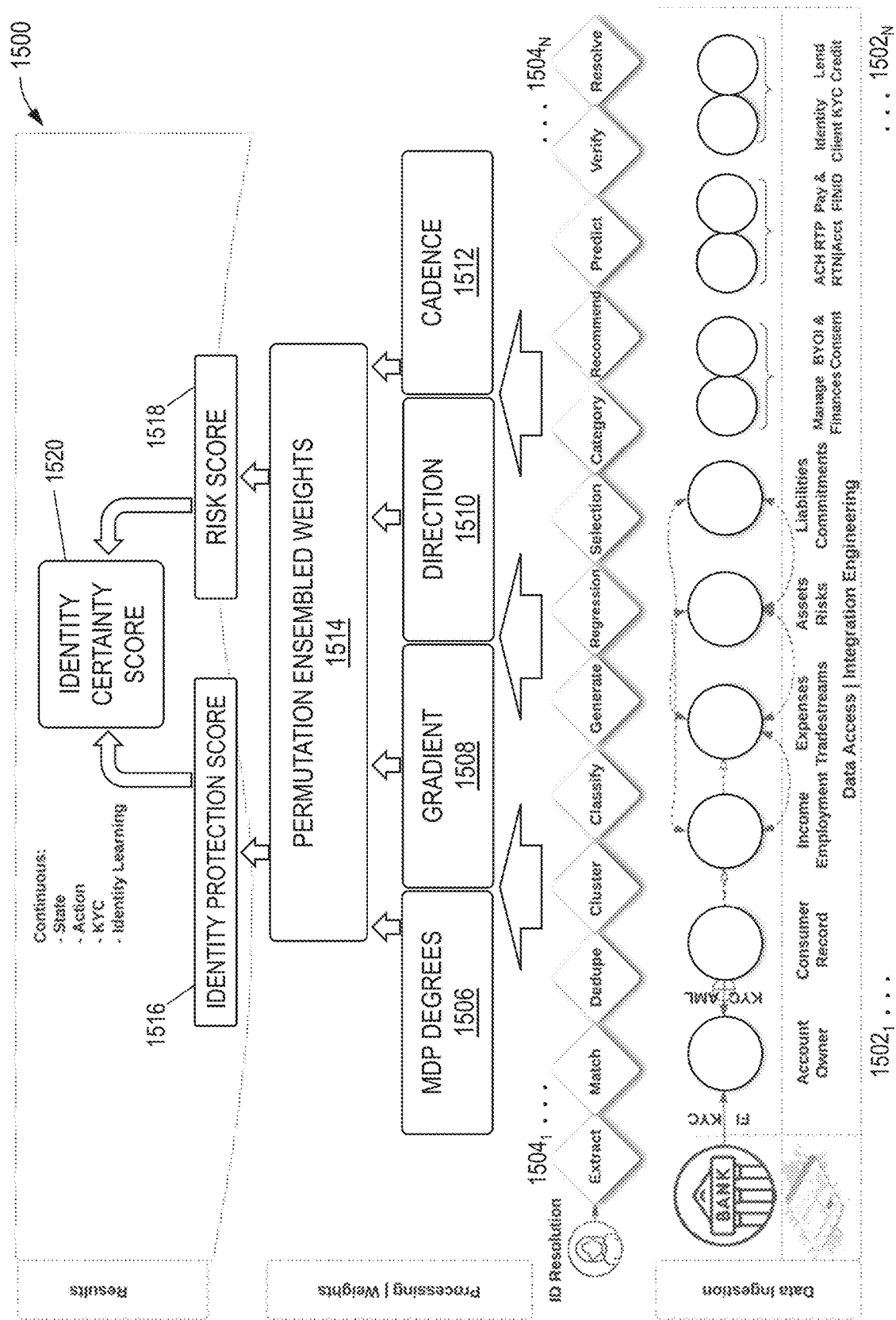
FIG. 15 is a schematic of an identity certainty model (or CIDaaS model), in accordance with an aspect of the invention.

FIG. 15 is a schematic of an identity certainty model $1500$ (or CIDaaS model), in accordance with an aspect of the invention. In the example embodiment, the data flow direction is from the bottom of FIG. 15 to the top of FIG. 15. The identity certainty model $1500$ begins with accessing data and integrations. The first in the data ingestion block/table includes a plurality of data types and/or use cases of data, as indicated by reference characters $1502_1 \ldots 1502_n$. For example, when the database server $12$ connects to a financial institution (FI) with an API or integration (i.e., data access), for example, over the communications network $22$ (shown in FIG. 1), the database server $12$ may be able to access an account details page that includes account owner information (data). The account details page, or another page, may include an ACH or account routing number (RTN) and an account ID (or PAN) on it as well, or the data may be received from the FI wherever it is provided.

In the example embodiment, the data types and/or use cases of data include account owner, customer record, income/employment, expenses/tradestreams, assets/risks, liabilities/commitments, manage finances, bring your own identity (BYOI) & consent, ACH/RTP/RTN|account data, Pay and FinID, identity client KYC, and lend/credit. It is noted that each of the listed data types and/or use cases of data are depicted by way of example and not by way of limitation. Accordingly, the listed data types and/or use cases of data are, therefore, not limiting. In some embodiments, the Income, expenses, tradestreams, liabilities, and some assets are available on an account transaction page or table. Employment data may be provided from a paystub image/pdf extraction or a payroll provider API. Assets may also be on an account details page or other tables.

As described herein, a customer associated with the data types and/or use cases of data grants data access consent to the database server $12$, and more particularly, the CIDaaS model via the method $700$ discussed above. Furthermore, the customer may grant one or more data access consents to one or more of the data providers associated with the data types and/or use cases of data, as may be required or desired.

In the exemplary embodiment, the ID Resolution row depicts a plurality of coding or modeling (e.g., machine learning, statistical inference, deep learning, etc.) techniques, as indicated by reference characters $1504_1 \ldots 1504_n$. The plurality of coding or modeling techniques $1504_1 \ldots 1504_n$ are assembled into a data processing model or engine, which is applied to the customer's data.

The identity certainty model $1500$ also includes the MDP degrees model $1506$, the gradient model $1508$, the direction model $1510$, and the cadence model $1512$. The MDP degrees model $1506$, the gradient model $1508$, the direction model $1510$, and the cadence model $1512$ are configured to calculate various metrics from the modeling techniques $1504_1 \ldots 1504_n$.

Furthermore, as depicted in FIG. 15, the identity certainty model $1500$ includes the permutation ensembled weights $1514$. The outputs of the MDP degrees model $1506$, the gradient model $1508$, the direction model $1510$, and the cadence model $1512$ are weighted by applying the permutation ensembled weights $1514$. The data flow process takes the grouped approaches and metrics to create the permutations to answer a question. That question may include checking if a set is closed, has associativity, if items have identity or are changing, and if the items can have invertibility or not. The results after weighting include an identity protection score $1516$ and a risk score $1518$.

Massaging the identity protection score $1516$ and a risk score $1518$ into the total possible set of actions and states (the Hamiltonian) allows the data flow process to measure "step-wise" change in the states and actions to reach an optimal reward and loss for a stated problem like identity or risk.

Figure 16:
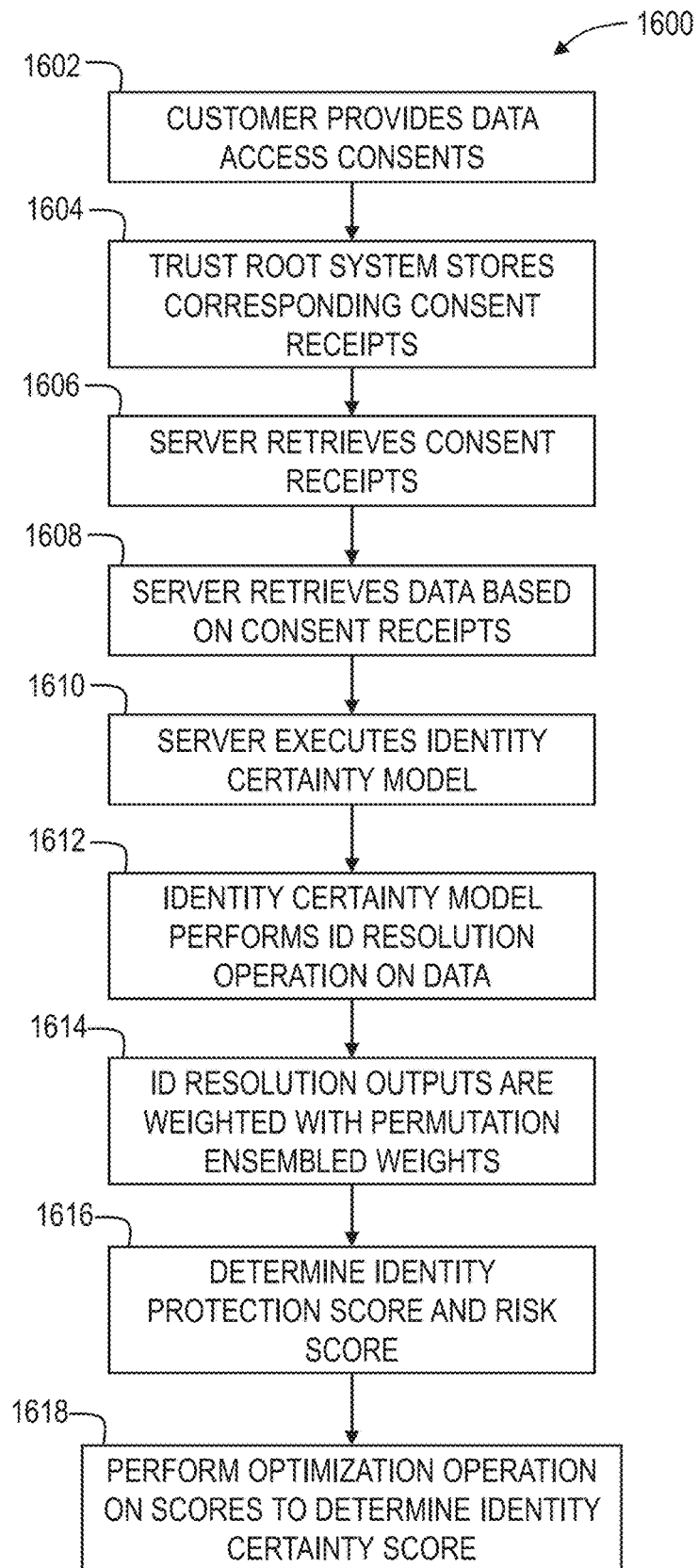
FIG. 16 is a flowchart illustrating an exemplary computer-implemented method for determining an identity certainty score with a CIDaaS model, in accordance with one embodiment of the present disclosure.

FIG. 16 is a flowchart illustrating an exemplary computer-implemented method $1600$ for determining an identity certainty score, such as the identity certainty score $1520$ (shown in FIG. 15), with a CIDaaS model, in accordance with one embodiment of the present disclosure. The operations described herein may be performed in the order shown in FIG. 16 or may be performed in a different order. Furthermore, some operations may be performed concurrently as opposed to sequentially. In addition, some operations may be optional.

The computer-implemented method $1600$ is described below, for ease of reference, as being executed by exemplary devices and components introduced with the embodiments illustrated in FIGS. 1-6 and 12-15. In one embodiment, the method $1600$ may be implemented by the database server $12$ (shown in FIG. 1). In the exemplary embodiment, the method $1600$ relates to calculating an identity certainty score for a customer. While operations within the method $1600$ are described below regarding the database server $12$ and/or the trust root server $50$ (shown in FIG. 2), the method $1600$ may be implemented on other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s)

may instruct the processor or processing units to perform additional, fewer, or alternative actions, including those discussed elsewhere herein.

Referring to operation 1602, a customer, such as the customer 58 (shown in FIG. 2), connects to the trust root server 50 and provides a plurality of data access consents to a plurality of data types data indicated by reference characters $1502_1 \ldots 1502_n$ (shown in FIG. 15). The customer 58 may connect directly to the trust root server 50 using, for example, the customer device 20, or may be redirected to the trust root server 50 by the database server 12. For example, if the customer 58 wishes to signup thew the CIDaaS service, the customer may connect directly to the database server 12 to create an account. The database server 12 may then redirect the customer 58 to the trust root server 50 for granting consent to one or more of the customer's financial data accounts. At operation 1604, the trust root server 50 creates and stores a plurality of data access consent receipts in the consent store or repository 70 (shown in FIG. 2).

At operation 1606, the database server 12 receives the plurality of data access consent receipts from the consent store or repository 70. In the example embodiment, each data access consent receipt is associated with a specific data provider and identifies the database server 12 as a data recipient. In addition, each data access consent receipt includes one or more data scopes that defines what data may be provided to the database server 12. At operation 1608, the database server 12 retrieves the plurality of data types $1502_1 \ldots 1502_n$ from the corresponding data providers associated with the data access consent receipts.

At operation 1610, the database server 12 executes the identity certainty model 1500 to perform an ID resolution operation on the plurality of data types $1502_1 \ldots 1502_n$. More particularly, the database server 12 performs a plurality of coding or modeling techniques $1504_1 \ldots 1504_n$ on the plurality of data types $1502_1 \ldots 1502_n$. In the example, the plurality of coding or modeling techniques $1504_1 \ldots 1504_n$ include, without limitation, one or more of data extraction, data matching, deduplication, clustering, classifying, regression, selection, categorization, predictions, verification, data resolution, among other data processes.

At operation 1612, the identity certainty model 1500 passes the data outputs produced by the ID resolution operation to at least one of the MDP degrees model 1506, the gradient model 1508, the direction model 1510, and the cadence model 1512, each of which calculates various metrics on at least a portion of the ID resolution operation, and more particularly, on one or more of the modeling techniques $1504_1 \ldots 1504n$. At operation 1614, the outputs of the MDP degrees model 1506, the gradient model 1508, the direction model 1510, and the cadence model 1512 are passed, by the identity certainty model 1500, to the permutation ensembled weights 1514, where weighting is applied to the outputs by the permutation ensembled weights 1514.

At operation 1616, the permutation ensembled weights 1514 outputs an identity protection score 1516 and the risk score 1518. At operation 1618, the identity certainty model 1500 performs an optimization operation on the identity protection score 1516 and the risk score 1518. In particular, the optimization process facilitates continuous optimization of the state space, action, KYC, and identity learning of the identity protection score 1516 and the risk score 1518 to resolve the identity certainty score 1520.

An example use case of the method 1600 includes a customer permissioning his or her demand deposit account (DDA) checking account, savings account, a 401 k account, and an existing mortgage account to apply for a new mortgage. In the method 1600, the CIDaaS model captures the account owner data (e.g., name and address) for each account. The application for a new mortgage will likely require a customer record (e.g., name, address, DOB, SSN, etc.) for FCRA rights (e.g., review or dispute data used in lending).

The personal data and account data from each account can be used to identify the customer. In this case, the customer might have used their 401 k account to pay an escrow payment that would show up when the mortgage account was opened, and used their DDA and savings accounts for payments on the mortgage. Those payment transactions may have a description and memo that mentions the customer's name in the payment and mortgage account details. Income may be deposited into the DDA and/or the savings account. The description and memo may mention the customer's name and their employer. Addresses may be present in the data for these transactions and for merchant transactions. All of these data can be modeled and measured with distance to see if it is the same person. Finally, knowing how this person differs from others and the loss/reward for each of these transactions can help us know more about the identity of the person.

By differentiating between this person and others with their consented personal data, and all of their consented account/transaction data, the CIDaaS service will likely be able to ensure the customer's identity is protected better than any other approach.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, changes, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A server comprising:
   an identity certainty model including permutation ensembled weights;
   a processor; and
   a memory having computer-executable instructions stored thereon, the computer-executable instructions, when executed by the processor, cause the processor to:
   receive a plurality of data access consent receipts from an external consent repository;
   based on the plurality of data access consent receipts, retrieve a plurality of data types from one or more data providers;

execute the identity certainty model on the plurality of data types, comprising:
    performing an identity (ID) resolution operation on the plurality of data types;
    using data outputs produced by the ID resolution operation, calculating metrics from the ID resolution operation;
    using the permutation ensembled weights, weighting data outputs produced by the metrics calculations;
    determining an identity protection score and a risk score based on the weighted data outputs;
    performing an optimization operation on the identity protection score and the risk score; and
    determining an identity certainty score based on a result of the optimization operation.

2. The server in accordance with claim 1, wherein each data access consent receipt is associated with a specific data provider, identifies the server as a data recipient, and includes one or more data scopes.

3. The server in accordance with claim 1,
    said step of performing the ID resolution operation on the plurality of data types comprises:
        performing a plurality of coding or modeling techniques on the plurality of data types.

4. The server in accordance with claim 3, wherein the plurality of coding or modeling techniques includes one or more of the following: data extraction, data matching, deduplication, clustering, classifying, regression, selection, categorization, predictions, verification, and data resolution.

5. The server in accordance with claim 1,
    said identity certainty model comprising a Markov decision process (MDP) degrees model, a gradient model, a direction model, and a cadence model,
    said step of calculating metrics from the ID resolution operation comprising applying the data outputs produced by the ID resolution operation to at least one of the MDP degrees model, the gradient model, the direction model, and the cadence model.

6. The server in accordance with claim 5, wherein the permutation ensembled weights is based on set theory and includes the following: closure, associativity, identity, and invertibility.

7. The server in accordance with claim 1,
    said computer-executable instructions cause the processor to:
        establish communication with a customer device of a customer; and
        redirect the customer device to a trust root server for granting a plurality of data access consents associated with the plurality of data types from the one or more data providers.

8. A computer-implemented method performed by a server, the server including a processor and an identity certainty model, the identity certainty model including permutation ensembled weights, said method comprising:
    receiving, by the processor, a plurality of data access consent receipts from an external consent repository;
    based on the plurality of data access consent receipts, retrieving, by the processor, a plurality of data types from one or more data providers;
    executing, by the processor, the identity certainty model on the plurality of data types, the executing step comprising:
        performing, via the processor, an identity (ID) resolution operation on the plurality of data types;
        using data outputs produced by the ID resolution operation, calculating, via the processor, metrics from the ID resolution operation;
        using the permutation ensembled weights, weighting, via the processor, data outputs produced by the metrics calculations;
        determining, via the processor, an identity protection score and a risk score based on the weighted data outputs;
        performing, via the processor, an optimization operation on the identity protection score and the risk score; and
        determining, via the processor, an identity certainty score based on a result of the optimization operation.

9. The computer-implemented method in accordance with claim 8, wherein each data access consent receipt is associated with a specific data provider, identifies the server as a data recipient, and includes one or more data scopes.

10. The computer-implemented method in accordance with claim 8,
    said step of performing the ID resolution operation on the plurality of data types comprising performing a plurality of coding or modeling techniques on the plurality of data types.

11. The computer-implemented method in accordance with claim 10, wherein the plurality of coding or modeling techniques includes one or more of the following: data extraction, data matching, deduplication, clustering, classifying, regression, selection, categorization, predictions, verification, and data resolution.

12. The computer-implemented method in accordance with claim 8,
    said identity certainty model comprising a Markov decision process (MDP) degrees model, a gradient model, a direction model, and a cadence model,
    said step of calculating metrics from the ID resolution operation comprising applying the data outputs produced by the ID resolution operation to at least one of the MDP degrees model, the gradient model, the direction model, and the cadence model.

13. The computer-implemented method in accordance with claim 12, wherein the permutation ensembled weights is based on set theory and includes the following: closure, associativity, identity, and invertibility.

14. The computer-implemented method in accordance with claim 8, further comprising:
    establishing, via the processor, communication with a customer device of a customer; and
    redirecting, via the processor, the customer device to a trust root server for granting a plurality of data access consents associated with the plurality of data types from the one or more data providers.

15. A non-transitory computer-readable storage medium having computer-executable instructions stored thereon for use by a server, the server including a processor and an identity certainty model, the identity certainty model including permutation ensembled weights, the computer-executable instructions, when executed by the processor, cause the processor to:
    receive a plurality of data access consent receipts from an external consent repository;
    based on the plurality of data access consent receipts, retrieve a plurality of data types from one or more data providers;
    execute the identity certainty model on the plurality of data types, the executing step comprising:

performing an identity (ID) resolution operation on the plurality of data types;

using data outputs produced by the ID resolution operation, calculating metrics from the ID resolution operation;

using the permutation ensembled weights, weighting data outputs produced by the metrics calculations;

determining an identity protection score and a risk score based on the weighted data outputs;

performing an optimization operation on the identity protection score and the risk score; and determining an identity certainty score based on a result of the optimization operation.

16. The non-transitory computer-readable storage medium in accordance with claim 15, wherein each data access consent receipt is associated with a specific data provider, identifies the server as a data recipient, and includes one or more data scopes.

17. The non-transitory computer-readable storage medium in accordance with claim 15, said step of performing the ID resolution operation on the plurality of data types comprising performing a plurality of coding or modeling techniques on the plurality of data types.

18. The non-transitory computer-readable storage medium in accordance with claim 17, wherein the plurality of coding or modeling techniques includes one or more of the following: data extraction, data matching, deduplication, clustering, classifying, regression, selection, categorization, predictions, verification, and data resolution.

19. The non-transitory computer-readable storage medium in accordance with claim 15, said identity certainty model comprising a Markov decision process (MDP) degrees model, a gradient model, a direction model, and a cadence model, said step of calculating metrics from the ID resolution operation comprising applying the data outputs produced by the ID resolution operation to at least one of the MDP degrees model, the gradient model, the direction model, and the cadence model.

20. The non-transitory computer-readable storage medium in accordance with claim 19, wherein the permutation ensembled weights is based on set theory and includes the following: closure, associativity, identity, and invertibility.

* * * * *